(12) United States Patent
Ogihara et al.

(10) Patent No.: US 11,327,505 B2
(45) Date of Patent: May 10, 2022

(54) CONTROL APPARATUS OF WORK VEHICLE, WORK VEHICLE, AND CONTROL METHOD OF WORK VEHICLE

(71) Applicant: Komatsu Ltd., Tokyo (JP)

(72) Inventors: Masanori Ogihara, Tokyo (JP); Ryuu Yamamura, Tokyo (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 16/720,246

(22) Filed: Dec. 19, 2019

(65) Prior Publication Data
US 2020/0142427 A1    May 7, 2020

Related U.S. Application Data

(62) Division of application No. 15/577,498, filed as application No. PCT/JP2017/008018 on Feb. 28, 2017, now Pat. No. 10,551,848.

(51) Int. Cl.
*G05D 1/02* (2020.01)
*B60P 1/16* (2006.01)

(52) U.S. Cl.
CPC ........... *G05D 1/0274* (2013.01); *G05D 1/027* (2013.01); *G05D 1/0272* (2013.01);
(Continued)

(58) Field of Classification Search
CPC .................................................. G05D 1/0274
See application file for complete search history.

(56) References Cited

U.S. PATENT DOCUMENTS 5,998,953 A   12/1999  Nakamura et al.
6,081,756 A    6/2000  Mio et al.
(Continued)

FOREIGN PATENT DOCUMENTS

CA    2948804 A1    7/2016
JP    10-069599 A   3/1998
(Continued)

OTHER PUBLICATIONS

Australian Government Examination Report No. 2, dated Jun. 9, 2020 for Application No. 2019200000.
(Continued)

*Primary Examiner* — Michael A Berns
(74) *Attorney, Agent, or Firm* — Locke Lord LLP

(57) ABSTRACT

A control apparatus of a work vehicle includes a course data acquisition unit acquiring course data indicating a traveling condition of a work vehicle that includes a travel route, a travel range data acquisition unit acquiring travel range data indicating a travel range of the work vehicle that is defined with a preset travel width based on the travel route, a detection data acquisition unit acquiring detection data of a detection device that has detected a travel direction of the work vehicle, a prediction unit predicting, based on the detection data, a prescribed position distant from a current position of the work vehicle traveling according to the course data, a determination unit determining whether the prescribed position exists within the travel range, and a drive control unit stopping traveling of the work vehicle when it is determined that the prescribed position does not exist within the travel range.

7 Claims, 14 Drawing Sheets

(52) U.S. Cl.
CPC ......... *G05D 1/0278* (2013.01); *G05D 1/0297* (2013.01); *B60P 1/16* (2013.01); *G05D 2201/0202* (2013.01)

(56) References Cited

U.S. PATENT DOCUMENTS

| | | | |
|---|---|---|---|
| 6,216,079 | B1 | 4/2001 | Matsuda |
| 6,625,540 | B2 | 9/2003 | Kageyama |
| 6,681,157 | B2 | 1/2004 | Kageyama |
| 8,655,588 | B2 | 2/2014 | Wong et al. |
| 9,037,338 | B2* | 5/2015 | Osagawa ............. G05D 1/0217 701/26 |
| 9,243,923 | B2 | 1/2016 | Sugihara et al. |
| 10,248,128 | B2 | 4/2019 | Tanaka et al. |
| 10,394,250 | B2* | 8/2019 | Kadono ................. E02F 9/205 |
| 10,551,848 | B2* | 2/2020 | Ogihara ............... G05D 1/0297 |
| 10,635,112 | B2* | 4/2020 | Kobashi .............. G05D 1/0212 |
| 10,671,074 | B2* | 6/2020 | Hashimoto ............ E02F 3/841 |
| 2001/0044697 | A1 | 11/2001 | Kageyama |
| 2002/0165645 | A1 | 11/2002 | Kageyama |
| 2010/0076640 | A1 | 3/2010 | Maekawa et al. |
| 2012/0303176 | A1 | 11/2012 | Wong et al. |
| 2013/0325208 | A1 | 12/2013 | Osagawa et al. |
| 2015/0142258 | A1 | 5/2015 | Sugihara et al. |
| 2017/0017235 | A1 | 1/2017 | Tanaka et al. |
| 2017/0315561 | A1 | 11/2017 | Kadono et al. |
| 2018/0355587 | A1* | 12/2018 | Hashimoto ............. E02F 3/841 |

FOREIGN PATENT DOCUMENTS

| | | |
|---|---|---|
| JP | 11-065655 A | 3/1999 |
| JP | 2000-127931 A | 5/2000 |
| JP | 2000-339029 A | 12/2000 |
| JP | 2012-113429 A | 6/2012 |
| WO | 2016/111386 A1 | 7/2016 |
| WO | WO2016/167375 A1 | 10/2016 |

OTHER PUBLICATIONS

International Search Report dated Apr. 11, 2017, issued for PCT/JP2017/008018.
Examination Report dated Jan. 25, 2018, issued for the corresponding Australian patent application No. 2017237758.
Examination Report dated Oct. 25, 2018, issued for the corresponding Canadian patent application No. 2,988,573.

* cited by examiner

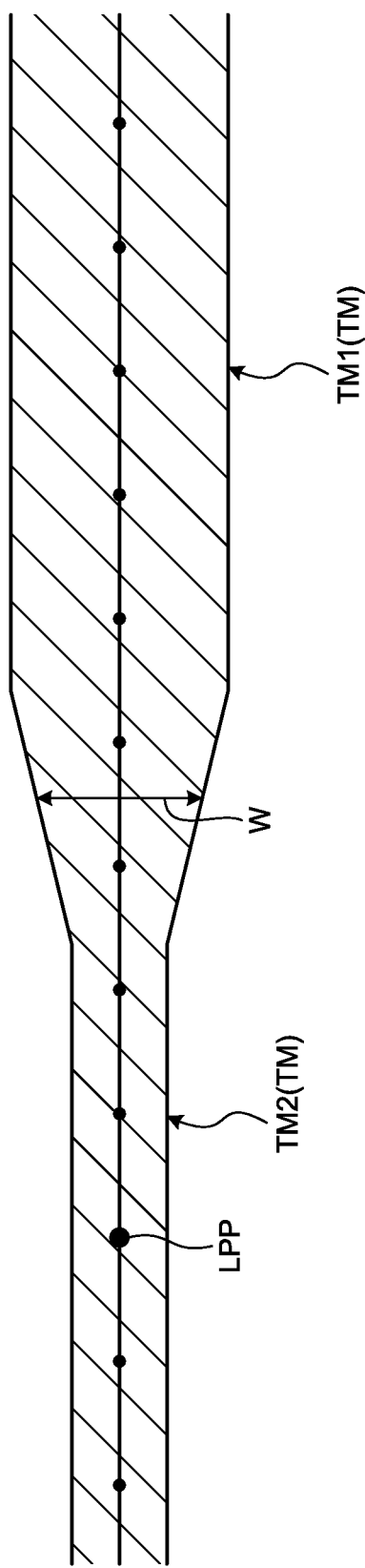

CONTROL APPARATUS OF WORK VEHICLE, WORK VEHICLE, AND CONTROL METHOD OF WORK VEHICLE

This Application is a Division of Application 15/577,498 filed on Nov. 28, 2017. The entire contents of these applications are incorporated herein by reference in their entirety.

FIELD

The present invention relates to a control apparatus of a work vehicle, a work vehicle, and a control method of a work vehicle.

BACKGROUND

In wide-area work locations such as mines, work vehicles that travel with no human are used for a carrying work. After freight is loaded by a loader onto the work vehicles in a loading site, the work vehicles travel on a conveying road to an earth unloading site, and the freight is unloaded in the earth unloading site.

CITATION LIST

Patent Literature

Patent Literature 1: Japanese Laid-open Patent Publication No. 2012-113429 A

SUMMARY

Technical Problem

If a traveling work vehicle and an obstacle existing near the work vehicle come into contact with each other, productivity in a work location may deteriorate.

The object of an aspect of the present invention is to suppress a deterioration of productivity in a work location.

Solution to Problem

According to a first embodiment of the present invention, a control apparatus of a work vehicle comprises: a course data acquisition unit configured to acquire course data indicating a traveling condition of a work vehicle that includes a travel route; a travel range data acquisition unit configured to acquire travel range data indicating a travel range of the work vehicle that is defined with a preset travel width based on the travel route; a detection data acquisition unit configured to acquire detection data of a detection device that has detected a travel direction of the work vehicle; a prediction unit configured to predict, based on the detection data, a prescribed position that is distant from a current position of the work vehicle traveling according to the course data; a determination unit configured to determine whether the prescribed position exists within the travel range; and a drive control unit configured to stop traveling of the work vehicle when it is determined that the prescribed position does not exist within the travel range.

Advantageous Effects of Invention

According to an aspect of the present invention, a deterioration of productivity in a work location can be suppressed.

BRIEF DESCRIPTION OF DRAWINGS

FIG. 15 is a diagram schematically illustrating an example of travel range data in a loading site according to the present embodiment.

DESCRIPTION OF EMBODIMENTS

An embodiment according to the present invention will be described below with reference to the drawings. Nevertheless, the present invention is not limited to this. Components in the embodiment to be described below can be appropriately combined. In addition, a part of components are not used in some cases.

[Management System]

Figure 1:
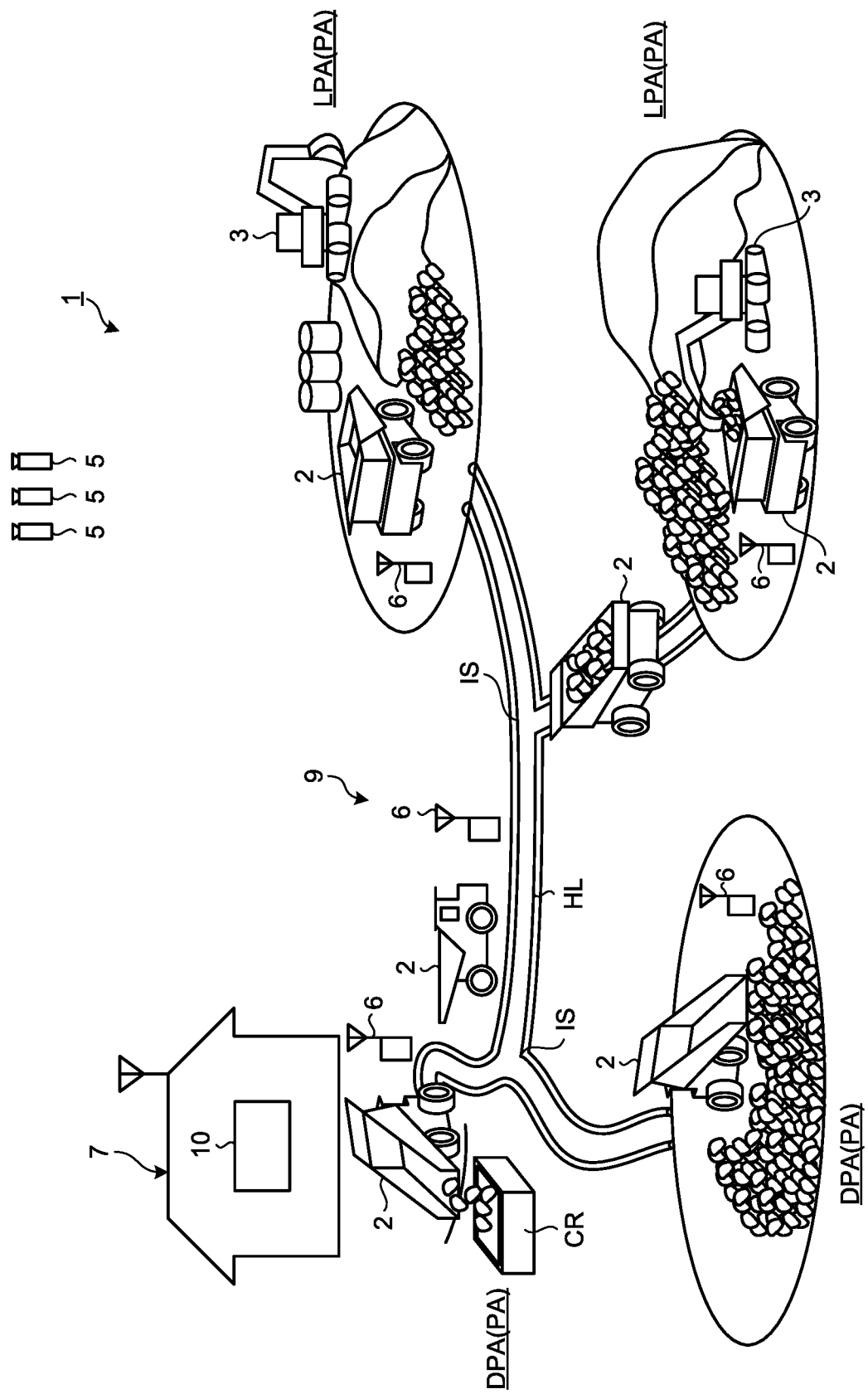
FIG. 1 is a diagram schematically illustrating an example of a management system of a work vehicle according to the present embodiment.

A management system 1 of a work vehicle 2 according to the present embodiment will be described. FIG. 1 is a diagram schematically illustrating an example of the management system 1 of the work vehicle 2 according to the present embodiment. The management system 1 executes travel management of the work vehicle 2. In the present embodiment, the work vehicle 2 is a dump truck 2 being a transporter vehicle that can travel on mines.

As illustrated in FIG. 1, the dump truck 2 travels on at least part of a work location PA of a mine and a conveying road HL connecting to the work location PA. The work location PA includes at least either one of a loading site LPA and an earth unloading site DPA. The conveying road HL includes an intersection IS. The dump truck 2 travels according to course data CD set in the conveying road HL and the work location PA.

The loading site LPA is an area where a loading work of loading freight onto the dump truck 2 is executed. In the loading site LPA, a loader 3 like an excavator operates. The earth unloading site DPA is an area where an unloading work of unloading the freight from the dump truck 2 is executed. The earth unloading site DPA is provided with a crusher CR, for example.

The management system 1 includes a management apparatus 10 and a communication system 9. The management apparatus 10 includes a computer system, and is installed in a control facility 7 provided in the mine. The communication system 9 executes data communication and signal communication between the management apparatus 10 and the dump truck 2. The communication system 9 may include a plurality of relaying devices 6 that relay data and signals. The management apparatus 10 and the dump truck 2 perform wireless communication via the communication system 9.

In the present embodiment, the dump truck 2 is an unmanned dump truck that travels with no human and without operations of a driver. The dump truck 2 travels on the mine based on a command signal from the management apparatus 10.

In the present embodiment, a position of the dump truck 2 is detected using the Global Navigation Satellite System (GNSS). The Global Navigation Satellite System includes the Global Positioning System (GPS). The GNSS includes a plurality of positioning satellites 5. The GNSS detects a position defined by coordinate data of latitude, longitude, and altitude. A position detected by the GNSS is an absolute position defined by a global coordinate system. An absolute position of the dump truck 2 in the mine is detected by the GNSS.

[Dump Truck]

Figure 2:
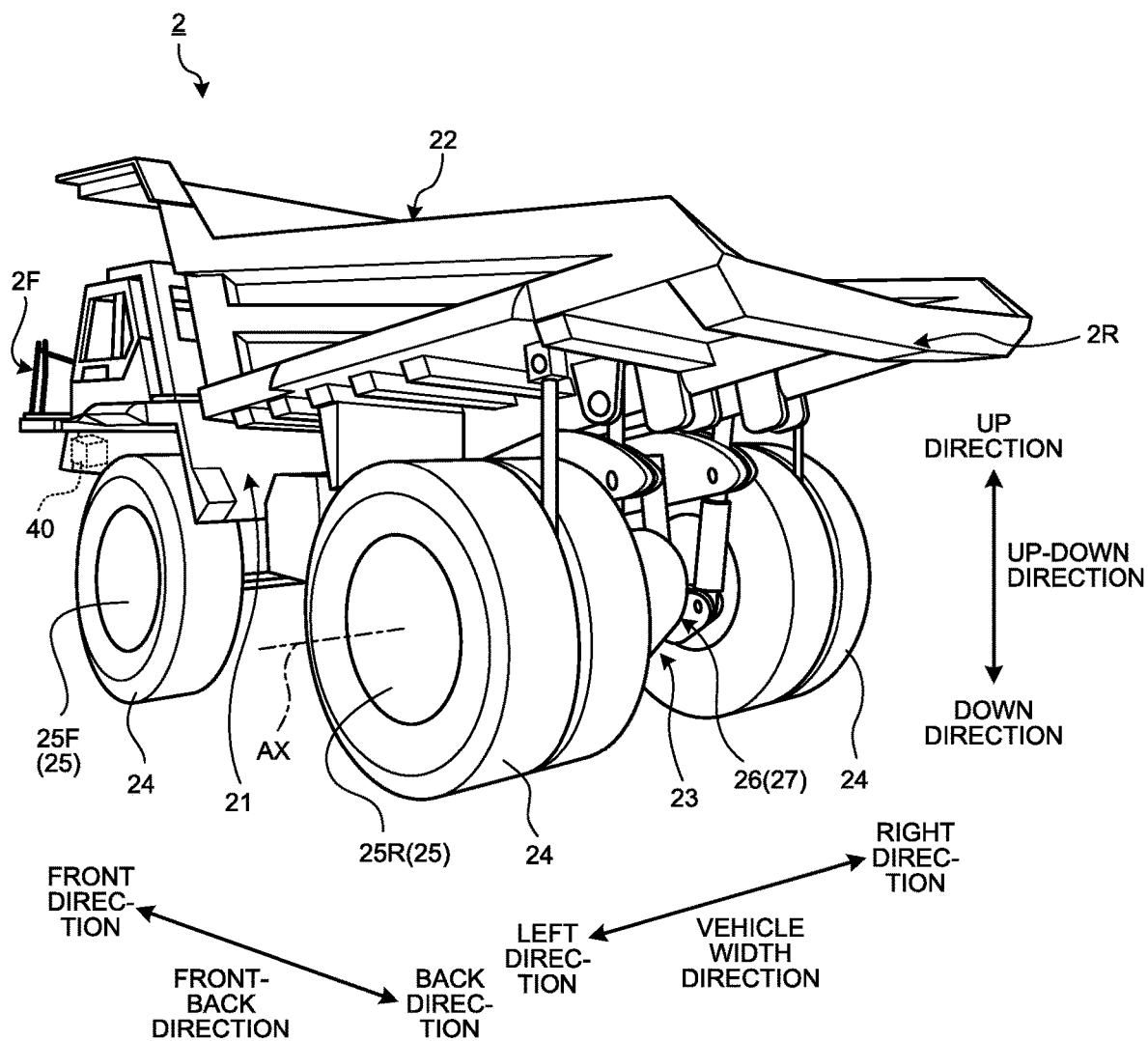
FIG. 2 is a perspective view in which a dump truck according to the present embodiment is viewed from a back direction.

Next, the dump truck 2 according to the present embodiment will be described. FIG. 2 is a perspective view in which the dump truck 2 according to the present embodiment is viewed from a back direction. As illustrated in FIG. 2, the dump truck 2 includes a vehicle body frame 21, a dump body 22 supported on the vehicle body frame 21, a travel apparatus 23 that travels with supporting the vehicle body frame 21, and a control apparatus 40.

The travel apparatus 23 includes wheels 25 to which tires 24 are attached. The wheels 25 include front wheels 25F and rear wheels 25R. The front wheels 25F are steered by a steering apparatus 33. The rear wheels 25R are not steered. The wheels 25 rotate around a rotation axis AX.

In the following description, a direction parallel to the rotation axis AX of the rear wheels 25R will be appropriately referred to as a vehicle width direction, a traveling direction of the dump truck 2 will be appropriately referred to as a front-back direction, and a direction vertical to both of the vehicle width direction and the front-back direction will be appropriately referred to as an up-down direction.

One of the front-back direction is a front direction and an opposite direction of the front direction is a back direction. One of the vehicle width direction is a right direction, and an opposite direction of the right direction is a left direction. One of the up-down direction is an up direction, and an opposite direction of the up direction is a down direction. The front wheels 25F are disposed anterior to the rear wheels 25R. The front wheels 25F are disposed on both sides in the vehicle width direction. The rear wheels 25R are disposed on both sides in the vehicle width direction. The dump body 22 is disposed superior to the vehicle body frame 21.

The vehicle body frame 21 supports a driving apparatus 31 that generates driving force for driving the travel apparatus 23. The dump body 22 is a member onto which freight is to be loaded.

The travel apparatus 23 includes a rear axle 26 that transmits driving force generated by the driving apparatus 31, to the rear wheels 25R. The rear axle 26 includes a wheel axis 27 that supports the rear wheels 25R. The rear axle 26 transmits driving force generated by the driving apparatus 31, to the rear wheels 25R. The rear wheels 25R rotates around the rotation axis AX, by the driving force supplied from the rear axle 26. The travel apparatus 23 thereby travels.

The dump truck 2 can go forward and backward. Going forward refers to traveling in a state in which an anterior portion 2F of the dump truck 2 faces the traveling direction. Going backward refers to traveling in a state in which a posterior portion 2R of the dump truck 2 faces the traveling direction.

The control apparatus 40 controls the dump truck 2. The control apparatus 40 can control the dump truck 2 based on a command signal transmitted from the management apparatus 10.

[Management Apparatus and Control Apparatus]

Figure 3:
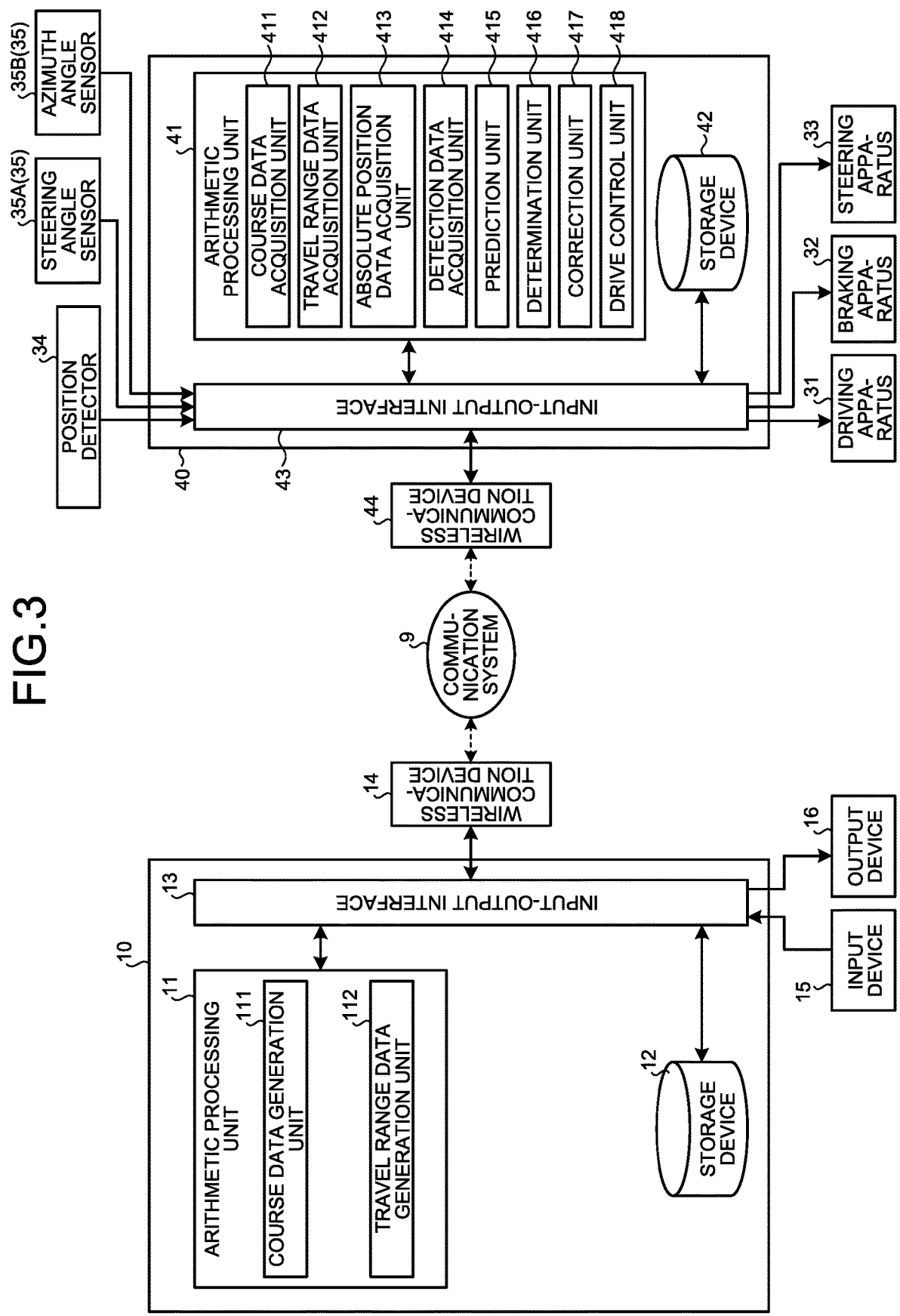
FIG. 3 is a functional block diagram illustrating an example of a management apparatus and a control apparatus according to the present embodiment.

Next, the management apparatus 10 and the control apparatus 40 according to the present embodiment will be described. FIG. 3 is a functional block diagram illustrating an example of the management apparatus 10 and the control apparatus 40 according to the present embodiment. The management apparatus 10 is installed in the control facility 7. The control apparatus 40 is mounted on the dump truck 2. The management apparatus 10 and the control apparatus 40 perform wireless communication via the communication system 9.

The management apparatus 10 includes a computer system. The management apparatus 10 includes an arithmetic processing unit 11 including a processor such as a central processing unit (CPU), a storage device 12 including a memory and a storage such as a read only memory (ROM) or a random access memory (RAM), and an input-output interface 13.

The management apparatus 10 is connected with a wireless communication device 14. The wireless communication device 14 is disposed in the control facility 7. The management apparatus 10 communicates with the dump truck 2 via the wireless communication device 14 and the communication system 9.

The management apparatus 10 is connected with an input device 15 and an output device 16. The input device 15 and the output device 16 are installed in the control facility 7. The input device 15 includes at least one of a computer keyboard, a mouse, and a touch panel, for example. Input data generated by the input device 15 being operated is output to the management apparatus 10. The output device 16 includes a display device. The display device includes a flat-panel display such as a liquid crystal display (LCD) or an organic electroluminescence display (OELD). The output device 16 operates based on display data output from the management apparatus 10. In addition, the output device 16 may be a printing device, for example.

The arithmetic processing unit 11 includes a course data generation unit 111 and a travel range data generation unit 112.

The course data generation unit 111 generates the course data CD indicating a traveling condition of the dump truck 2 traveling on the mine. The traveling condition of the dump truck 2 includes at least one of a travel route RP, a travel speed V, acceleration, deceleration, and a travel direction of the dump truck 2. In addition, the traveling condition of the dump truck 2 includes at least either one of a stop position and a departure position of the dump truck 2.

The travel range data generation unit 112 generates travel range data AD indicating a travel range TM of the dump truck 2 that is based on the travel route RP of the dump truck 2 and defined with a preset travel width W. The travel route RP is linearly set. The travel range TM is zonally set along the travel route RP so as to include the travel route RP.

The input-output interface 13 outputs the course data CD generated by the course data generation unit 111, to the dump truck 2. In addition, the input-output interface 13 outputs the travel range data AD generated by the travel range data generation unit 112, to the dump truck 2. The input-output interface 13 functions as an output unit that outputs the course data CD and the travel range data AD to the dump truck 2. The course data CD and the travel range data AD that have been generated by the arithmetic processing unit 11 are output to the dump truck 2 via the input-output interface 13 and the communication system 9.

The control apparatus 40 includes a computer system. The control apparatus 40 includes an arithmetic processing unit 41 including a processor such as a central processing unit (CPU), a storage device 42 including a memory and a storage such as a read only memory (ROM) or a random access memory (RAM), and an input-output interface 43.

The control apparatus 40 is connected with a wireless communication device 44. The wireless communication device 44 is disposed in the dump truck 2. The control apparatus 40 communicates with the management apparatus 10 via the wireless communication device 44 and the communication system 9.

The control apparatus 40 is connected with the driving apparatus 31, a braking apparatus 32, and the steering apparatus 33. In addition, the control apparatus 40 is connected with a position detector 34 and a detection device 35. The driving apparatus 31, the braking apparatus 32, the steering apparatus 33, the position detector 34, and the detection device 35 are mounted on the dump truck 2.

The driving apparatus 31 operates for driving the travel apparatus 23 of the dump truck 2. The driving apparatus 31 generates driving force for driving the travel apparatus 23. The driving apparatus 31 generates driving force for rotating the rear wheels 25R. The driving apparatus 31 includes an internal-combustion engine such as a diesel engine, for example. In addition, the driving apparatus 31 may include a generator that generates power by the operation of the internal-combustion engine, and an electrical motor that operates based on the power generated by the generator.

The braking apparatus 32 operates for braking the travel apparatus 23. The traveling of the travel apparatus 23 decelerates or stops by the operation of the braking apparatus 32.

The steering apparatus 33 operates for steering the travel apparatus 23 of the dump truck 2. The dump truck 2 is steered by the steering apparatus 33. The steering apparatus 33 steers the front wheels 25F.

The position detector 34 detects an absolute position of the dump truck 2. The position detector 34 includes a GPS antenna that receives a GPS signal from the positioning satellites 5, and a GPS calculator that calculates an absolute position of the dump truck 2 based on the GPS signal received by the GPS antenna.

The detection device 35 detects a travel direction of the dump truck 2. The detection device 35 includes a steering angle sensor 35A that detects a steering angle of the dump truck 2 that is made by the steering apparatus 33, and an azimuth angle sensor 35B that detects an azimuth angle of the dump truck 2. The steering angle sensor 35A includes, for example, a rotary encoder provided in the steering apparatus 33. The azimuth angle sensor 35B includes, for example, a gyro sensor provided in the vehicle body frame 21.

The arithmetic processing unit 41 includes a course data acquisition unit 411, a travel range data acquisition unit 412, an absolute position data acquisition unit 413, a detection data acquisition unit 414, a prediction unit 415, a determination unit 416, a correction unit 417, and a drive control unit 418.

The course data acquisition unit 411 acquires the course data CD generated by the course data generation unit 111 of the management apparatus 10.

The travel range data acquisition unit 412 acquires the travel range data AD generated by the travel range data generation unit 112 of the management apparatus 10.

The absolute position data acquisition unit 413 acquires absolute position data indicating an absolute position of the dump truck 2, from the position detector 34. In the present embodiment, the position detector 34 detects an absolute position of the GPS antenna provided in the dump truck 2. The absolute position data acquisition unit 413 calculates absolute position data indicating an absolute position of a specific portion AP of the dump truck 2, based on the absolute position of the GPS antenna that has been detected by the position detector 34. In the present embodiment, the specific portion AP of the dump truck 2 is a center portion of the wheel axis 27 in the vehicle width direction.

A relative position of the GPS antenna and the specific portion AP is known data that can be derived from, for example, design data or specification data of the dump truck 2, and is stored in the storage device 42. The absolute position data acquisition unit 413 can calculate the absolute position data indicating an absolute position of the specific portion AP of the dump truck 2, based on the absolute position of the GPS antenna that has been detected by the position detector 34, and the relative position of the GPS antenna and the specific portion AP that is stored in the storage device 42.

The detection data acquisition unit 414 acquires detection data of the detection device 35 that has detected a travel direction of the dump truck 2, from the detection device 35. The detection data includes steering angle data detected by the steering angle sensor 35A, and azimuth angle data detected by the azimuth angle sensor 35B. The detection data acquisition unit 414 acquires the steering angle data from the steering angle sensor 35A, and the azimuth angle data from the azimuth angle sensor 35B.

Based on the detection data, the prediction unit 415 predicts a prescribed position FP that is distant from a current position NP of the dump truck 2 traveling according to the course data CD. The prescribed position FP of the dump truck 2 refers to a position of the dump truck 2 that is obtainable after the dump truck 2 has traveled by a prescribed distance L from the current position NP of the dump truck 2 at an acquisition time point of the detection data. In the present embodiment, the prescribed distance L is, for example, 3 [m]. The prediction unit 415 predicts the prescribed position FP of the dump truck 2 that is obtainable after the dump truck 2 has traveled by 3 [m] from the current position NP, based on detection data acquired when the dump truck 2 exists at the current position NP.

The determination unit 416 determines whether the prescribed position FP of the dump truck 2 exists within the travel range TM. More specifically, the determination unit 416 determines whether the prescribed position FP of the dump truck 2 that has been predicted by the prediction unit 415 exists within the travel range TM defined by the travel range data AD acquired by the travel range data acquisition unit 412.

The correction unit 417 corrects the travel width W defined by the travel range data AD, based on the azimuth angle data acquired by the detection data acquisition unit 414.

Based on the course data CD acquired by the course data acquisition unit 411, the drive control unit 418 outputs a drive control signal that controls at least one of the driving apparatus 31, the braking apparatus 32, and the steering apparatus 33 of the dump truck 2. The drive control signal includes an accelerator signal to be output to the driving apparatus 31, a braking command signal to be output to the braking apparatus 32, and a steering command signal to be output to the steering apparatus 33.

The drive control unit 418 stops the traveling of the dump truck 2 when it is determined that the prescribed position FP of the dump truck 2 that has been predicted by the prediction unit 415 does not exist within the travel range TM.

[Course Data and Travel Range Data]

Figure 4:
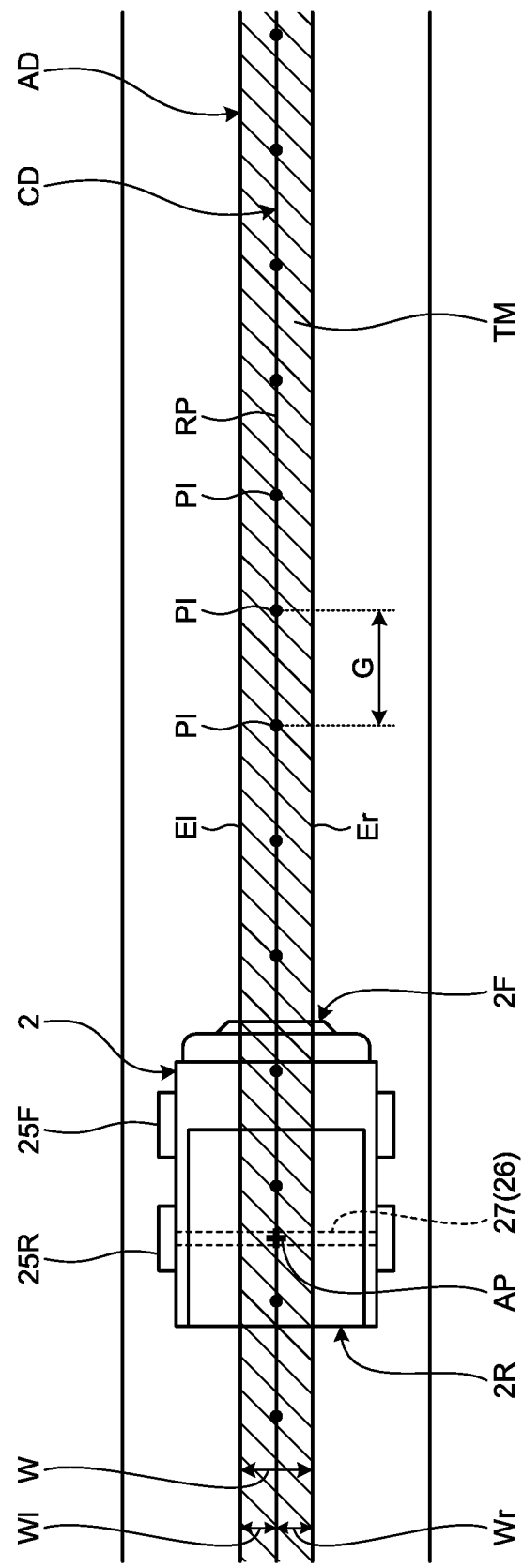
FIG. 4 is a diagram schematically illustrating course data and travel range data according to the present embodiment.

Next, the course data CD and the travel range data AD according to the present embodiment will be described. FIG. 4 is a diagram schematically illustrating the course data CD and the travel range data AD according to the present embodiment.

The course data CD defines a traveling condition of the dump truck 2. The traveling condition of the dump truck 2 includes at least one of a travel route RP, a travel speed V, acceleration, deceleration, and a travel direction of the dump truck 2.

As illustrated in FIG. 4, the course data CD includes an aggregate of a plurality of course points PI that are set at a constant interval G. Each of the plurality of course points PI includes absolute position data of the dump truck 2, travel speed data of the dump truck 2 at a position at which a corresponding course point PI is set, and travel direction data of the dump truck 2 at the position at which the corresponding course point PI is set.

The travel route RP of the dump truck 2 is defined based on a trajectory passing through the plurality of course points PI. The travel route RP is linearly set. Based on the travel speed data, the travel speed V of the dump truck 2 at the position at which the course point PI is set is defined. Based on the travel direction data, the travel direction of the dump truck 2 at the position at which the course point PI is set is defined. The travel route RP defined by the course points PI is a target travel route. The travel speed V of the dump truck 2 that is defined by a course point PI is a target travel speed. The travel direction of the dump truck 2 that is defined by a course point PI is a target travel direction.

The dump truck 2 travels on the mine according to the course data CD. The dump truck 2 travels on the mine so that the specific portion AP of the dump truck 2 moves along the travel route RP. In the present embodiment, the specific portion AP of the dump truck 2 is a center portion of the wheel axis 27 in the vehicle width direction.

The travel range data AD defines the travel range TM of the dump truck 2 that is based on the travel route RP of the dump truck 2 and defined with the preset travel width W.

As illustrated in FIG. 4, the travel range TM includes the travel route RP, and is zonally set along the travel route RP. In a width direction of the travel range TM, the travel route RP is defined at the center of the travel range TM. In other words, in the width direction of the travel range TM, a distance Wr between the travel route RP and one end portion Er of the travel range TM and a distance Wl between the travel route RP and another end portion El of the travel range TM are substantially equal. In addition, in the width direction of the travel range TM, the travel route RP may be defined at a position deviated from the center of the travel range TM.

Based on the absolute position data detected by the position detector 34, the drive control unit 418 controls the travel apparatus 23 so that the dump truck 2 travels in a state in which the specific portion AP of the dump truck 2 and the travel route RP match each other.

In addition, based on the absolute position data detected by the position detector 34, the drive control unit 418 stops the traveling of the dump truck 2 when it is determined that the specific portion AP of the dump truck 2 deviates from the travel route RP and moves to the outside of the travel range TM.

In the following description, a state in which the specific portion AP of the dump truck 2 has moved to the outside of the travel range TM will be appropriately referred to as "out of course".

The dump truck 2 travels on a rough road surface of the mine. In the present embodiment, the travel range TM that allows the traveling of the dump truck 2 even if the specific portion AP deviates from the travel route RP is set. When the specific portion AP is disposed in the travel range TM even if the specific portion AP deviates from the travel route RP, the drive control unit 418 continues the traveling of the dump truck 2. On the other hand, when the specific portion AP deviating from the travel route RP is disposed outside the travel range TM, the dump truck 2 is determined to have gone out of the course. When the dump truck 2 is determined to have gone out of the course, the drive control unit 418 stops the traveling of the dump truck 2.

The travel range data generation unit 112 can adjust the travel width W of the travel range TM. In the mine, there exist an area in which a large deviation amount between the specific portion AP and the travel route RP is allowed, and an area in which a deviation amount between the specific portion AP and the travel route RP needs to be made smaller. In other words, in the mine, there exist an area in which a large relative distance between the specific portion AP and the travel route RP is allowed, and an area in which a relative distance between the specific portion AP and the travel route RP needs to be made smaller. The travel range data generation unit 112 adjusts the travel width W based on an area of the mine. The travel range data generation unit 112 sets a large travel width W in the area in which a large deviation amount between the specific portion AP and the travel route RP is allowed, and sets a small travel width W in the area in which a deviation amount between the specific portion AP and the travel route RP needs to be made smaller.

The travel range data generation unit 112 sets the travel width W based on, for example, an obstacle existing near the traveling dump truck 2. The course data generation unit 111 sets the travel speed V of the dump truck 2 based on a traveling allowable width W.

For example, in the case of an area in which an obstacle does not exist near the dump truck 2 traveling according to the travel route RP, there is a low possibility that the dump truck 2 comes into contact with an obstacle even if the travel width W is made large. Thus, in the case of an area in which an obstacle does not exist near the dump truck 2, the travel range data generation unit 112 sets a large travel width W. In the travel range TM in which there is a low possibility of contact between the dump truck 2 and an obstacle, and a large travel range W is set, the course data generation unit 111 increases the travel speed V of the dump truck 2. If the travel speed V of the dump truck 2 is high, there is a high possibility that a deviation amount between the specific portion AP and the travel route RP becomes larger. Nevertheless, the frequency of out-of-course determination is reduced because the travel width W is large. Because the frequency of out-of-course determination is reduced even if the travel speed V of the dump truck 2 is increased, a deterioration of productivity in the mine is suppressed.

On the other hand, in the case of an area in which an obstacle exists near the dump truck 2 traveling according to the travel route RP, a possibility of contact between the dump truck 2 and the obstacle becomes higher if the travel width W is made large. Thus, in the case of an area in which an obstacle exists near the dump truck 2, the travel range data generation unit 112 sets a small travel width W. If the travel speed V of the dump truck 2 is high, there is a high possibility that a deviation amount between the specific portion AP and the travel route RP becomes larger. Thus, if the travel width W is small, if the travel speed V of the dump truck 2 is increased, the frequency of out-of-course determination increases, and productivity in the mine deteriorates. Thus, in the travel range TM in which a small travel range W is set for suppressing contact between the dump truck 2 and an obstacle, the course data generation unit 111 decreases the travel speed V of the dump truck 2.

[Travel Range Data in Loading Site]

Figure 5:
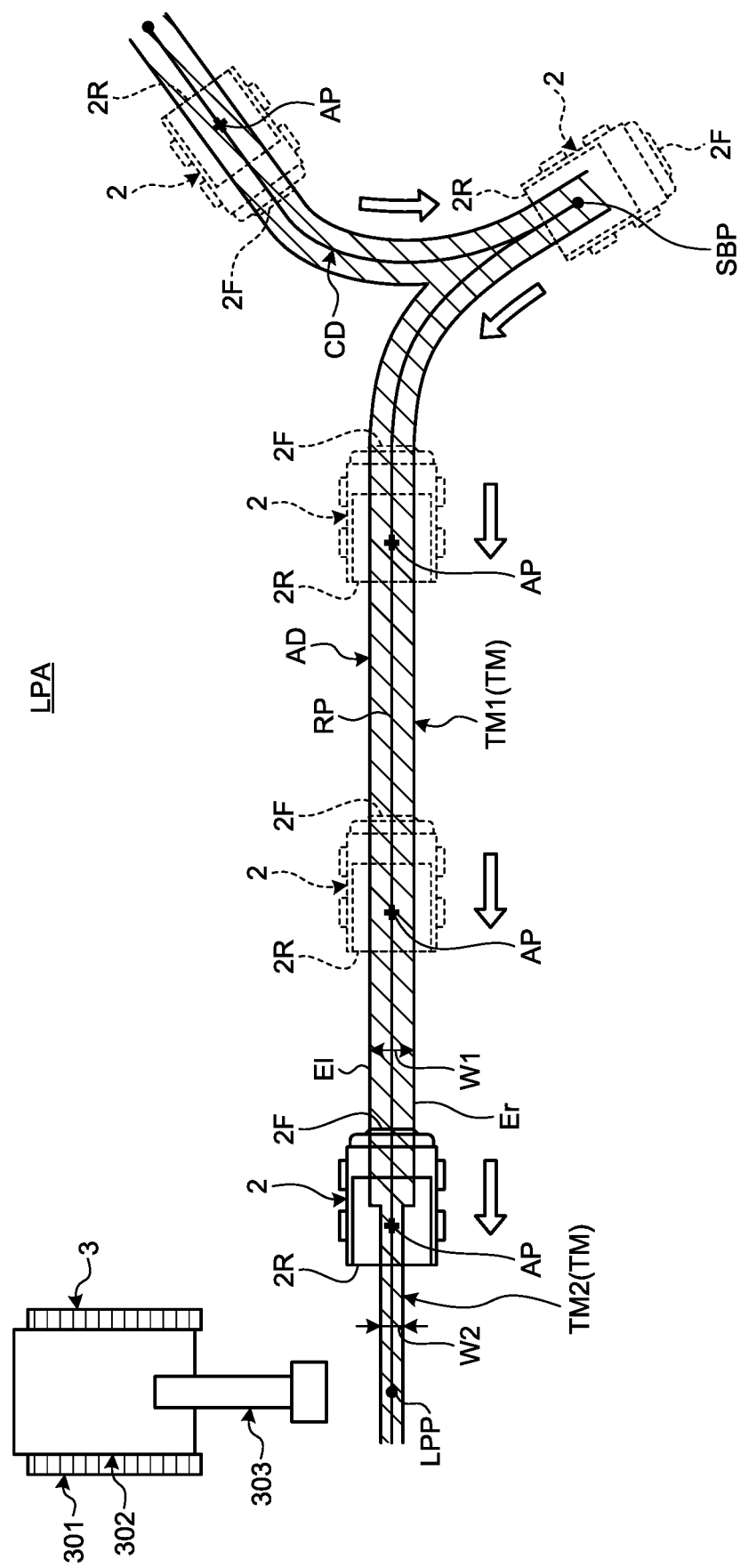
FIG. 5 is a diagram schematically illustrating an example of travel range data in a loading site according to the present embodiment.

Next, the travel range data AD in the loading site LPA according to the present embodiment will be described. FIG. 5 is a diagram schematically illustrating an example of the travel range data AD in the loading site LPA according to the present embodiment.

In the loading site LPA, the dump truck 2 comes close to the loader 3 by performing switchback. The switchback refers to an operation in which the dump truck 2 going forward switches a traveling direction at a sharp angle, and goes backward. In an example illustrated in FIG. 5, the course data CD defines a switchback point SBP in the loading site LPA. The dump truck 2 having entered the loading site LPA performs switchback at the switchback point SBP, and comes close to the loader 3 while going backward.

In addition, the course data CD defines a loading point LPP in the loading site LPA. The loading point LPP is a position where the loader 3 can load freight onto the dump truck 2. The dump truck 2 moves to the loading point LPP while going backward. After the dump truck 2 is disposed at the loading point LPP, freight is loaded onto the dump truck 2 by the loader 3.

Also in the loading site LPA, the travel range TM is defined based on the travel route RP. In the present embodiment, the travel range TM defined in the loading site LPA includes a first travel range TM1 defined with a first travel width W1, and a second travel range TM2 defined with a second travel width W2 smaller than the first travel width W1.

As illustrated in FIG. 5, the second travel range TM2 includes the loading point LPP where freight is loaded onto the dump truck 2. The dump truck 2 travels from the first travel range TM1 to the second travel range TM2. The dump truck 2 comes close to the loading point LPP set in the second travel range TM2 while going backward in the first travel range TM1.

The loader 3 is disposed on the outside in the width direction of the second travel range TM2. The second travel range TM2 is set based on a size of the loader 3 that loads freight onto the dump truck 2.

The loader 3 includes a lower travel body 301, an upper swing body 302 supported on the lower travel body 301, and a work device 303 movably supported on the upper swing body 302. The work device 303 includes a boom, an arm, and a bucket. The loading point LPP is set inside a swing radius of the work device 303. If the second travel width W2 is large, for example, if the specific portion AP is disposed at the end portion El of the second travel range TM2 that is close to the upper swing body 302, a possibility of contact between the dump truck 2 and the loader 3 becomes higher. If the second travel width W2 is small, out-of-course determination is made even if the specific portion AP slightly deviates from the travel route RP, and the traveling of the dump truck 2 frequently stops. This deteriorates productivity in the mine. In the present embodiment, the second travel width W2 is defined based on the sizes of the upper swing body 302 and the lower travel body 301 so that the dump truck 2 moving to the loading point LPP does not come into contact with the upper swing body 302 or the lower travel body 301 of the loader 3, and productivity in the mine does not deteriorate. By the dump truck 2 traveling so that the specific portion AP exists in the second travel range TM2, contact between the dump truck 2 and the loader 3 is suppressed.

In the present embodiment, a travel speed V2 of the dump truck 2 in the second travel range TM2 is equal to or smaller than a travel speed V1 of the dump truck 2 in the first travel range TM1. The loader 3 can be regarded as an obstacle of the dump truck 2. In the first travel range TM1 that is distant from the loading point LPP, there is a low possibility of contact between the loader 3 and the dump truck 2 traveling in the first travel range TM1. Thus, by increasing the travel speed V1 of the dump truck 2 in the first travel range TM1, a deterioration of productivity in the mine is suppressed. In addition, if the travel speed V1 of the dump truck 2 traveling on a rough road surface of the mine is increased, there is a high possibility that a deviation amount between the specific portion AP and the travel route RP becomes larger. Because the first travel width W1 of the first travel range TM1 is large, even if the travel speed V1 of the dump truck 2 is high, a movement of the specific portion AP to the outside of the first travel range TM1 is suppressed. This reduces the frequency of out-of-course determination, and suppresses frequent stop of the traveling of the dump truck 2. Thus, a deterioration of productivity in the mine is suppressed.

On the other hand, in the second travel range TM2 including the loading point LPP, there is a high possibility of contact between the loader 3 and the dump truck 2 traveling in the second travel range TM2. Thus, the travel range data generation unit 112 narrows the second travel width W2 of the second travel range TM2. This suppresses a possibility of contact between the dump truck 2 and the loader 3. Because the second travel width W2 of the second travel range TM2 is small, if the dump truck 2 goes backward at the travel speed V1 in the second travel range TM2, a possibility that the specific portion AP goes out of the course to the outside of the second travel range TM2 becomes higher. As a result, the frequency of out-of-course determination becomes higher, and the traveling of the dump truck 2 is frequently stopped, so that productivity in the mine deteriorates. In the second travel range TM2 defined with the small second travel width W2, by reducing the travel speed V2 of the dump truck 2 to be smaller than the travel speed V1, the frequency of out-of-course determination is reduced, and frequent stop of the traveling of the dump truck 2 is suppressed. Thus, a deterioration of productivity in the mine is suppressed.

[Prediction of Prescribed Position]

Figure 6:
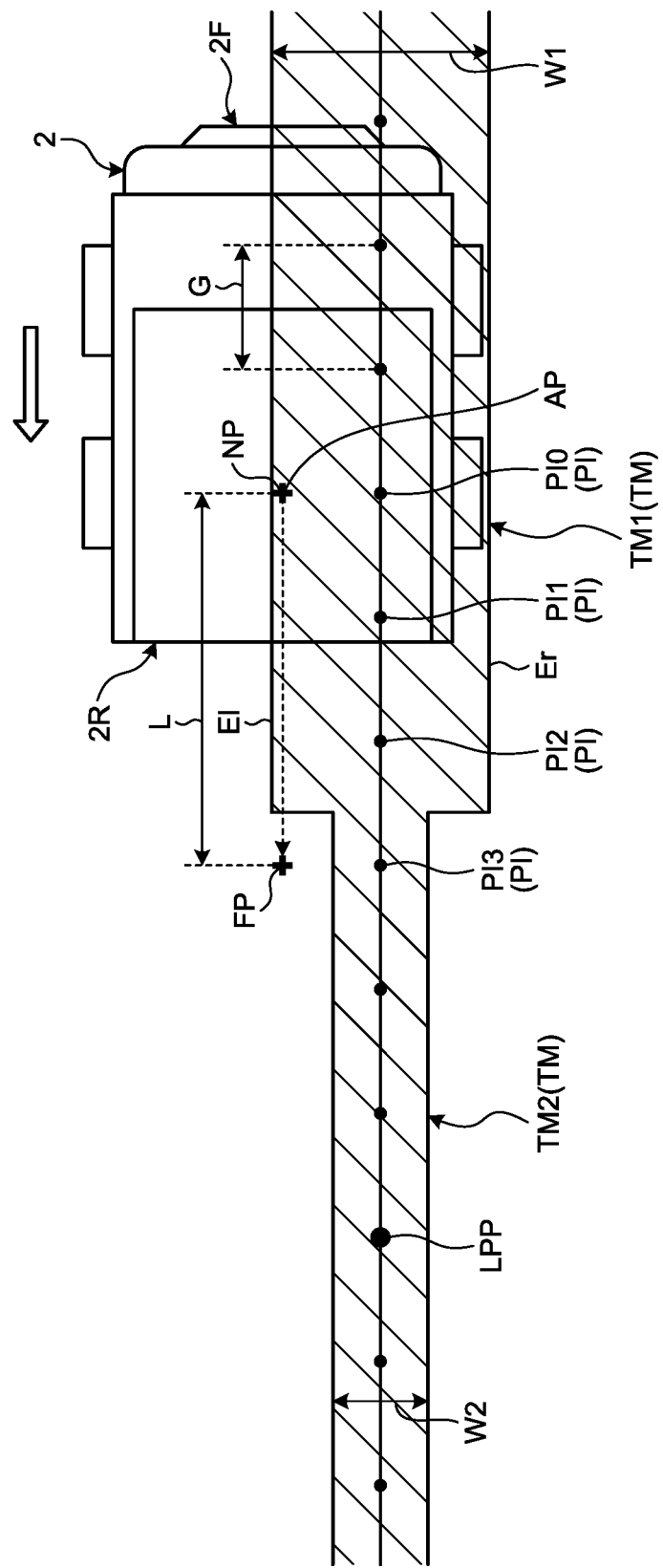
FIG. 6 is a schematic diagram for illustrating an operation of the control apparatus according to the present embodiment.
Figure 7:
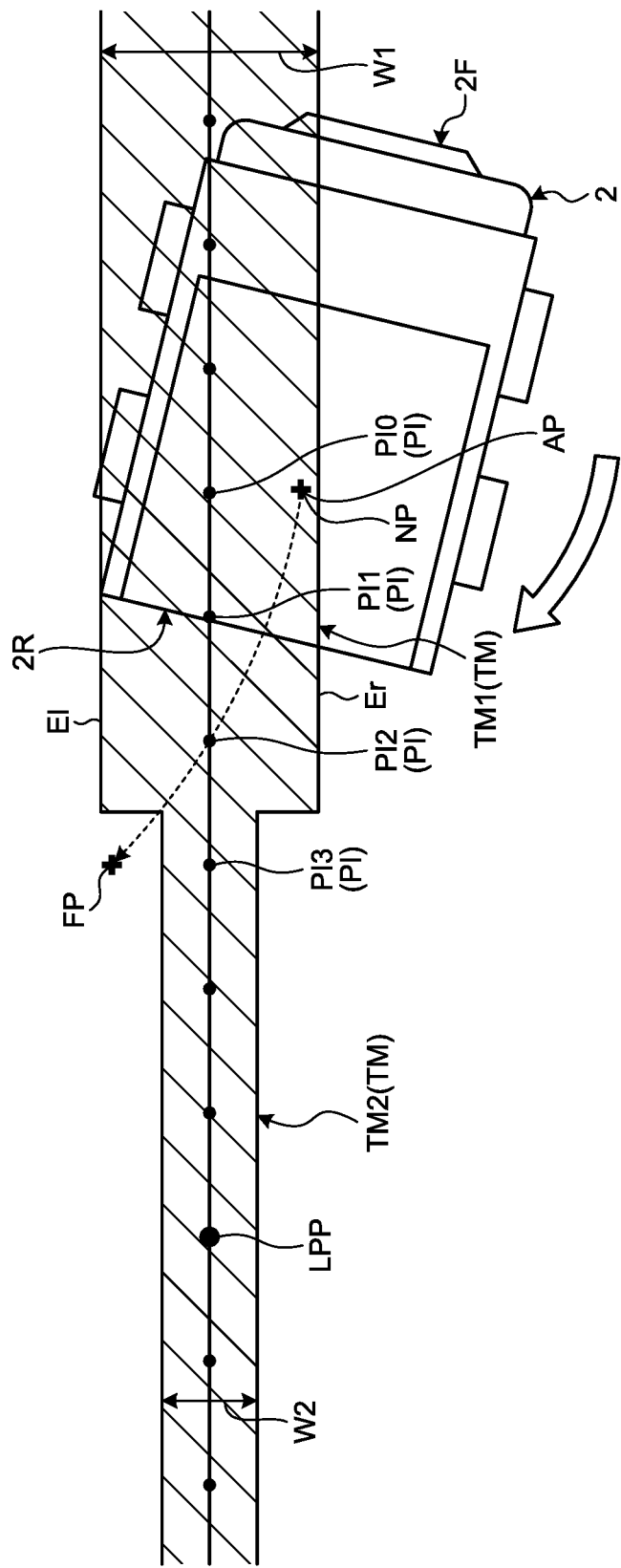
FIG. 7 is a schematic diagram for illustrating an operation of the control apparatus according to the present embodiment.

Next, an example of an operation of the control apparatus 40 according to the present embodiment will be described. FIGS. 6 and 7 are schematic diagrams for illustrating an operation of the control apparatus 40 according to the present embodiment.

In the present embodiment, the prediction unit 415 predicts the prescribed position FP of the dump truck 2 traveling according to the course data CD in the loading site LPA, based on detection data of the detection device 35. In the present embodiment, the prediction unit 415 predicts the prescribed position FP of the specific portion AP set in the dump truck 2 going backward toward the loading point LPP.

As illustrated in FIG. 6, the prescribed position FP of the specific portion AP refers to a position of the specific portion AP that is obtainable after the dump truck 2 has traveled by the prescribed distance L from the current position NP of the specific portion AP at the time when the detection data acquisition unit 414 acquires detection data of the travel direction of the dump truck 2. In the present embodiment, the prescribed distance L is 3 [m]. The prediction unit 415 predicts the prescribed position FP of the specific portion AP of the dump truck 2 that is obtainable after the dump truck 2 has traveled by 3 [m], based on the detection data of the travel direction of the dump truck 2 that has been acquired when the specific portion AP of the dump truck 2 has passed through the current position NP.

In the present embodiment, an interval G of the course points PI is 1 [m]. As illustrated in FIG. 6, the prediction unit 415 predicts the prescribed position FP of the specific portion AP passing through a course point PI3 provided ahead by three points, based on the detection data of the travel direction of the dump truck 2 that has been acquired when the specific portion AP has passed through a course point PI0 being the current position NP. In addition, in the present embodiment, the specific portion AP passing through the course point PI (PI0, PI3) includes not only perfect matching between the specific portion AP and the course point PI, but also includes substantial matching between an absolute position of the specific portion AP in the traveling direction of the dump truck 2 and an absolute position of the course point PI.

The prediction unit 415 predicts a relative position between the second travel range TM2 and the prescribed position FP of the specific portion AP based on the detection data of the travel direction of the dump truck 2 that has been acquired when the dump truck 2 is traveling in the first travel range TM1.

The determination unit 416 determines whether the prescribed position FP of the specific portion AP that has been predicted by the prediction unit 415 exists within the second travel range TM2. In the present embodiment, the course point PI3 is a course point PI closest to the first travel range TM1 among a plurality of course points PI defined in the second travel range TM2. The determination unit 416 determines whether the prescribed position FP of the specific portion AP that has been predicted based on the detection data acquired when the dump truck 2 is traveling in the first travel range TM1 exists in the second travel range TM2.

The drive control unit 418 stops the traveling of the dump truck 2 when it is determined that the prescribed position FP of the specific portion AP that has been predicted based on the detection data acquired when the dump truck 2 is traveling in the first travel range TM1 does not exist in the second travel range TM2.

In other words, in the present embodiment, the control apparatus 40 predicts whether the specific portion AP of the dump truck 2 will go out of the course of the second travel range TM2 in the future, when the dump truck 2 is traveling in the first travel range TM1.

The second travel width W2 of the second travel range TM2 is smaller than the first travel width W1 of the first travel range TM1. Thus, as illustrated in FIG. 6, for example, if the dump truck 2 goes straight-backward in a state in which the specific portion AP is positioned at the end portion El in the width direction of the first travel range TM1, the prescribed position FP of the specific portion AP is predicted to be disposed outside the second travel range TM2. In this case, the dump truck 2 comes close to the loader 3, and a possibility of contact between the dump truck 2 and the loader 3 becomes higher.

In addition, as illustrated in FIG. 7, for example, if the dump truck 2 goes backward while swinging in a state in which the specific portion AP is positioned at the end portion Er in the width direction of the first travel range TM1, the prescribed position FP of the specific portion AP is predicted to be disposed outside the second travel range TM2. Also in this case, the dump truck 2 comes close to the loader 3, and a possibility of contact between the dump truck 2 and the loader 3 becomes higher.

In the present embodiment, it is predicted whether the prescribed position FP exists in the second travel range TM2, when the dump truck 2 is traveling in the first travel range TM1, and when it is predicted that the prescribed position FP does not exist in the second travel range TM2, the traveling of the dump truck 2 is stopped before the specific portion AP goes out of the first travel range TM1. This prevents contact between the dump truck 2 and the loader 3 before happens.

As mentioned above, in the present embodiment, the travel speed V2 of the dump truck 2 in the second travel range TM2 is equal to or smaller than the travel speed V1 of the dump truck 2 in the first travel range TM1. Thus, if it is determined that the specific portion AP has gone out of the course of the second travel range TM2 after the dump truck 2 has entered the second travel range TM2, the traveling of the dump truck 2 is stopped after the dump truck 2 starts low-speed traveling. As a result, a time until out-of-course determination becomes longer, and productivity in the mine deteriorates.

In the present embodiment, it is predicted whether the specific portion AP goes out of the course of the second travel range TM2, before the dump truck 2 enters the second travel range TM2. In other words, if it is predicted that the specific portion AP goes out of the course of the second travel range TM2, before the dump truck 2 starts low-speed traveling, the traveling of the dump truck 2 is stopped. If it is predicted that the specific portion AP goes out of the course of the second travel range TM2, the traveling of the dump truck 2 is stopped early. Thus, a deterioration of productivity in the mine can be suppressed.

[Prediction Method of Prescribed Position]

Figure 8:
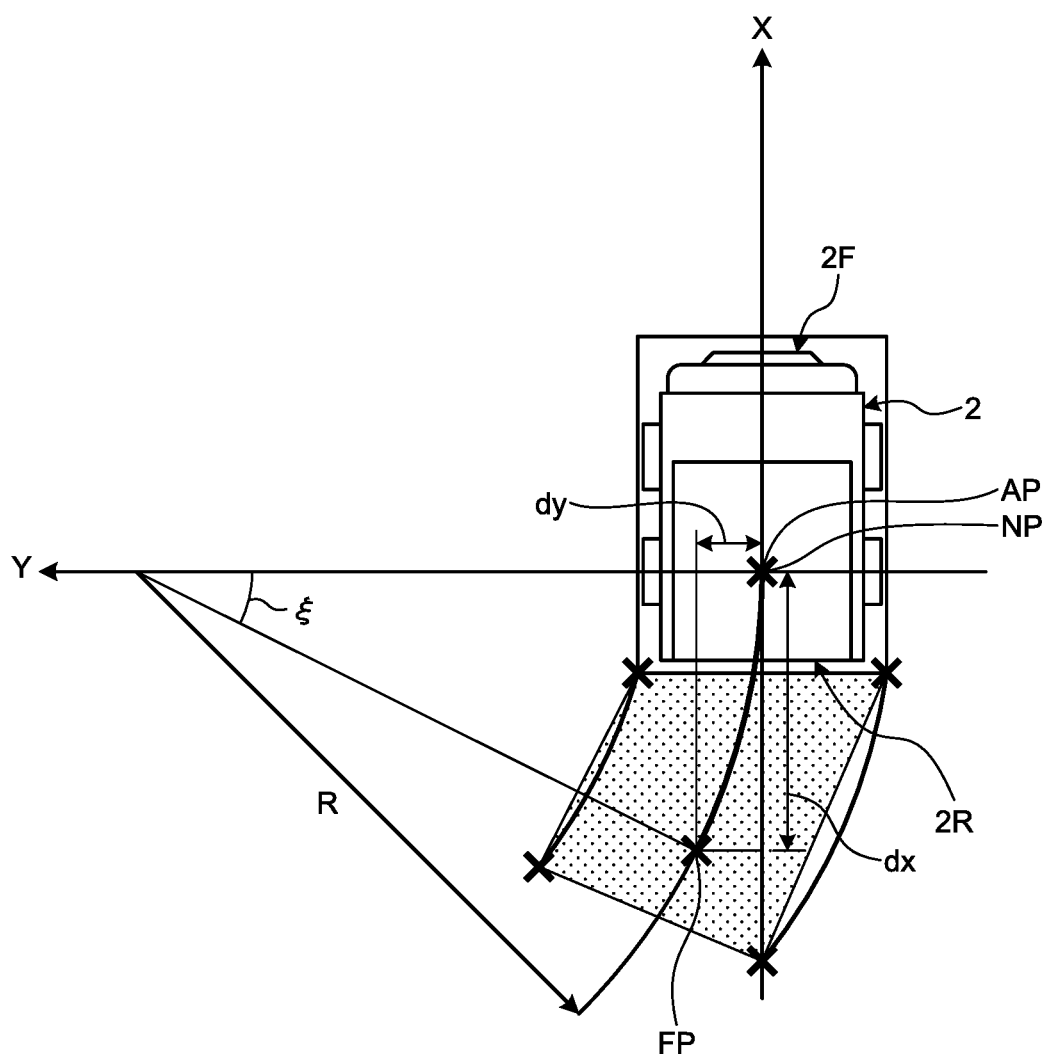
FIG. 8 is a schematic diagram for illustrating a prediction method of a prescribed position according to the present embodiment.
Figure 9:
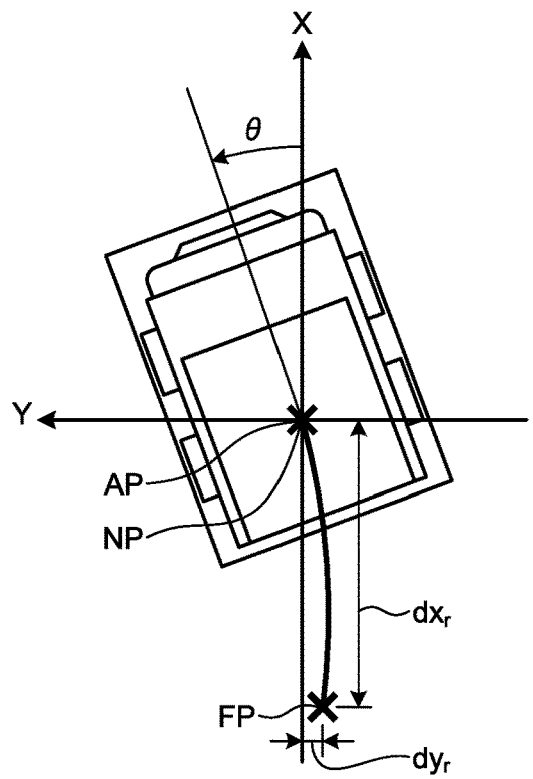
FIG. 9 is a schematic diagram for illustrating a prediction method of a prescribed position according to the present embodiment.

Next, a prediction method of the prescribed position FP according to the present embodiment will be described. FIGS. 8 and 9 are schematic diagrams for illustrating a prediction method of the prescribed position FP according to the present embodiment.

A calculation method of the prescribed position FP of the specific portion AP set in the dump truck 2 that is obtainable after the dump truck 2 has gone backward by the prescribed distance L [m] from a steering angle δ at the current position NP will be described with reference to FIG. 8.

When a wheel base of the dump truck is denoted by l [m], a steering angle is denoted by δ [rad], and a swing radius of the dump truck 2 that is based on the specific portion AP defined at the center portion of the wheel axis 27 supporting the rear wheels 25R is denoted by R [m], a swing radius R is calculated based on Formula (1).

$$R = \frac{\ell}{\tan \delta} \tag{1}$$

If the steering angle δ is supposed to be constant in a section in which the dump truck 2 goes backward by the prescribed distance L, a change amount dh [rad] of the orientation of the specific portion AP of the dump truck 2 is equal to an internal angle of arc having the swing radius R and the same dimension as the prescribed distance L. In other words, the change amount dh is calculated based on Formula (2).

$$dh = \xi = \frac{-L}{R} \tag{2}$$

Thus, when the front-back direction in a vehicle body coordinate system defined in the dump truck 2 is set as an X-axis direction, the vehicle width direction in the vehicle body coordinate system defined in the dump truck 2 is set as a Y-axis direction, the front direction of the dump truck 2 is set as a +X direction, and a left direction of the dump truck 2 is set as a +Y direction, a change amount dx [m] in the X-axis direction and a change amount dy [m] in the Y-axis direction of the prescribed position FP of the specific portion AP that are obtainable after the dump truck 2 has gone backward by the prescribed distance L are respectively calculated based on Formulae (3) and (4). Here, a left steering angle δ is assumed to be a positive value.

$$dx = R \sin \xi = R \sin \frac{-L}{R} \tag{3}$$

$$dy = R(1 - \cos \xi) = R\left(1 - \cos \frac{-L}{R}\right) \tag{4}$$

The change amount dx is a coordinate in the X-axis direction of the prescribed position FP that is based on the current position NP of the specific portion AP, and the change amount dy is a coordinate in the Y-axis direction of the prescribed position FP that is based on the current position NP of the specific portion AP. In this manner, based on Formulae (3) and (4), the prescribed position FP of the specific portion AP of the dump truck 2 that is obtainable after the specific portion AP existing at the current position NP has gone backward by the prescribed distance L [m] at a constant steering angle δ is predicted.

Next, a calculation method of the prescribed position FP of the specific portion AP of the dump truck 2 that is obtainable when the dump truck 2 rotates by an angle θ from the X-axis of the vehicle body coordinate system, with respect to the prescribed position FP predicted using the prediction method described with reference to FIG. 8 will be described with reference to FIG. 9.

When a coordinate in the X-axis direction of the prescribed position FP of the specific portion AP that is obtained after the rotation is denoted by $dx_r$ [m], and a coordinate in the Y-axis direction is denoted by $dy_r$ [m], a coordinate $dy_r$ is calculated based on Formula (5).

$$dy_r = R\left(\sin \frac{-L}{R} \sin \theta + \left(1 - \cos \frac{L}{R}\right) \cos \theta\right) \tag{5}$$

Here, when "x<<1", approximation to Formula (6) can be performed based on the result of Taylor expansion of up to quadratic.

$$\sin x \sim x, \tag{6}$$
$$\cos x \sim 1 - \frac{x^2}{2},$$
$$\tan x \sim x$$

When "θ<<1", and "δ<<1" are assumed, and approximation is performed so as to be "cos θ~1", a coordinate $dy_r$ is calculated based on Formula (7).

$$dy_r \sim -L\theta + \frac{L^2}{2R} = -L\theta + \frac{L^2}{2\ell} \delta \tag{7}$$

In this manner, the prescribed position FP of the specific portion AP that is obtainable after the dump truck 2 has gone backward by the prescribed distance L can be calculated as a sum of primary expressions of the angle θ and the steering angle δ.

[Correction of Travel Width that is Based on Protrusion Amount]

Figure 10:
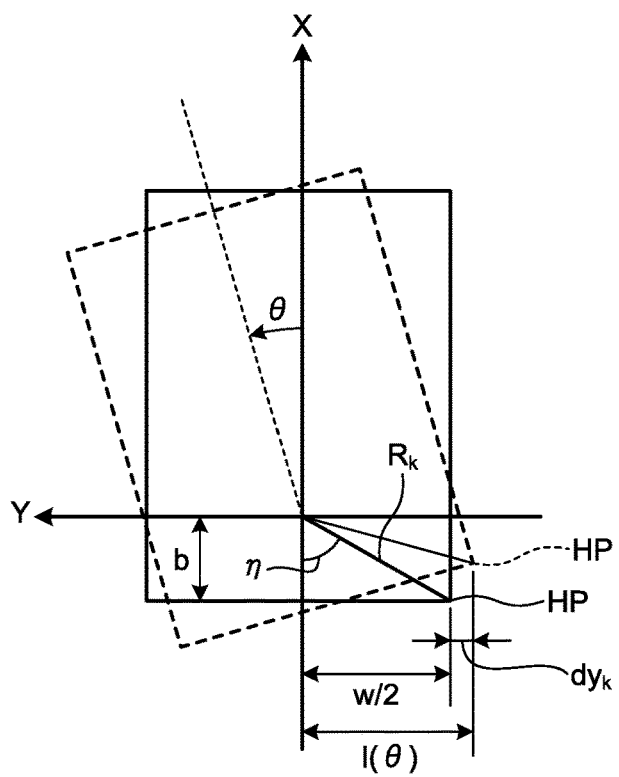
FIG. 10 is a schematic diagram for illustrating a correction method of a travel width according to the present embodiment.

In the present embodiment, the correction unit 417 corrects the travel width W based on the azimuth angle θ. FIG. 10 is a schematic diagram for illustrating a correction method of the travel width W according to the present embodiment.

As illustrated in FIG. 10, by the front wheels 25F being steered, the dump truck 2 rotates by an angle θ from the X-axis of the vehicle body coordinate system. When the dump truck 2 rotates by the angle θ from the X-axis of the vehicle body coordinate system, the dump truck 2 protrudes in the Y-axis direction from the state before the rotation, by a protrusion amount $dy_k$. The protrusion amount $dy_k$ is calculated based on Formula (8).

$$dy_k = \ell(\theta) - \frac{w}{2} \tag{8}$$

In Formula (8), l (θ) denotes a distance in the Y-axis direction from the specific portion AP positioned when the dump truck 2 is rotated around the specific portion AP by the angle θ, to a portion HP of the dump truck 2 that protrudes the most in the Y-axis direction, and is calculated based on Formula (9).

$$l(\theta) = R\sin(\eta+\theta) \quad (9)$$

In Formula (8), η denotes an angle formed by the X-axis and a straight line connecting the specific portion AP of the dump truck 2 and the portion HP that are before the rotation. When a vehicle width of the dump truck 2 is denoted by w, and a distance between the specific portion AP of the dump truck 2 and a rear end portion is denoted by b, the angle η is calculated based on Formula (10).

$$\eta = \tan^{-1}\left(\frac{w}{2b}\right) \quad (10)$$

In addition, when a distance between the specific portion AP and the portion HP is denoted by $R_k$, the distance $R_k$ is calculated based on Formula (11).

$$R_k = \sqrt{b^2 + \left(\frac{w}{2}\right)^2} \quad (11)$$

As described above, the protrusion amount $dy_k$ is calculated based on Formula (12).

$$dy_k = \sqrt{b^2 + \left(\frac{w}{2}\right)^2} \sin\left(\tan^{-1}\left(\frac{w}{2b}\right)+\theta\right) - \frac{w}{2} \quad (12)$$

In the present embodiment, the correction unit 417 calculates the protrusion amount $dy_k$ based on the angle θ indicating a rotation amount of the dump truck 2 that varies based on the steering angle δ, and the distance b and the vehicle width w being dimension data of the dump truck 2 that can be derived from design data or specification data of the dump truck 2. The correction unit 417 corrects the travel width W based on the calculated protrusion amount $dy_k$.

Figure 11:
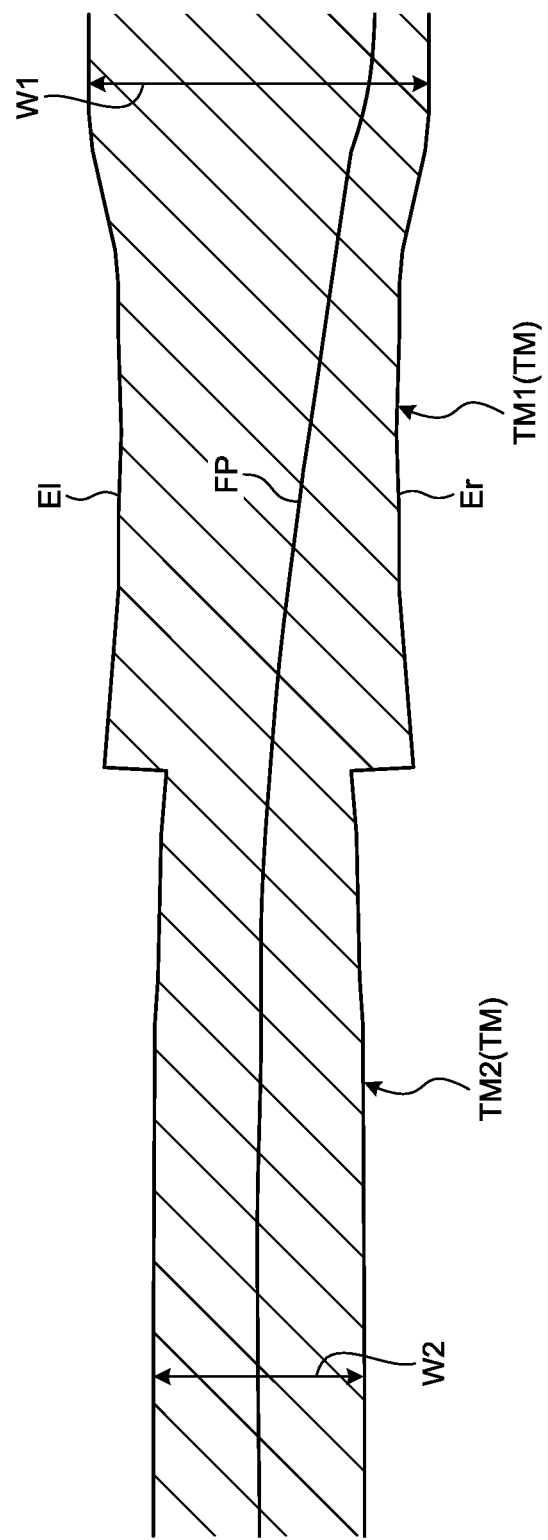
FIG. 11 is a diagram schematically illustrating an example of a travel range corrected by a correction unit according to the present embodiment.

FIG. 11 is a diagram schematically illustrating an example of the travel range TM corrected by the correction unit 417 according to the present embodiment. As illustrated in FIG. 11, if the dump truck 2 is steered, the prescribed position FP varies based on the steering angle δ. In addition, if the dump truck 2 is steered, and the protrusion amount $dy_k$ varies, the travel width W varies based on the protrusion amount $dy_k$. As illustrated in FIG. 5, for example, the travel range data generation unit 112 generates the first travel range TM1 having the constant first travel width W1, and the second travel range TM2 having the constant second travel width W2. Based on the protrusion amount $dy_k$, the correction unit 417 corrects the first travel width W1 of the first travel range TM1 that has been generated by the travel range data generation unit 112 and acquired by the travel range data acquisition unit 412. In addition, based on the protrusion amount $dy_k$, the correction unit 417 corrects the second travel width W2 of the second travel range TM2 that has been generated by the travel range data generation unit 112 and acquired by the travel range data acquisition unit 412. In the present embodiment, the correction unit 417 executes correction of subtracting the protrusion amount $dy_k$ from the first travel width W1 of the first travel range TM1 that has been acquired by the travel range data acquisition unit 412.

In addition, the correction unit 417 executes correction of subtracting the protrusion amount $dy_k$ from the second travel width W2 of the second travel range TM2 that has been acquired by the travel range data acquisition unit 412. In other words, the first travel width W1 obtained after subtracting the protrusion amount $dy_k$ from the first travel width W1 acquired by the travel range data acquisition unit 412 is a corrected first travel width W1a. The second travel width W2 obtained after subtracting the protrusion amount $dy_k$ from the second travel width W2 acquired by the travel range data acquisition unit 412 is a corrected second travel width W2a.

The drive control unit 418 controls the traveling of the dump truck 2 based on the first travel range TM1 and the second travel range TM2 that have been corrected by the correction unit 417. When the specific portion AP is determined to have gone out of the course of the first travel range TM1 and the second travel range TM2 that have been corrected by the correction unit 417, the drive control unit 418 stops the traveling of the dump truck 2. In addition, the determination unit 416 determines whether the prescribed position FP of the specific portion AP of the dump truck 2 exists in the second travel range TM2 corrected by the correction unit 417. The drive control unit 418 stops traveling of the dump truck 2 when it is determined that the prescribed position FP of the specific portion AP of the dump truck 2 does not exist in the second travel range TM2 corrected by the correction unit 417.

By the travel range TM being corrected by the correction unit 417, contact between the dump truck 2 and the loader 3 is effectively suppressed. In the present embodiment, if the specific portion AP exists in the travel range TM, out-of-course determination is not made, and the dump truck 2 can go backward. Nevertheless, for example, when the dump truck 2 does not go straight-backward, and goes backward while slightly swinging, even if the specific portion AP exists in the travel range TM, a distance between at least part of the dump truck 2 and the loader 3 becomes shorter, and the dump truck 2 and the loader 3 may come into contact with each other. In other words, if the dump truck 2 goes backward while swinging, even if the specific portion AP exists in the travel range TM, a possibility of contact between the dump truck 2 and the loader 3 becomes higher due to the protrusion amount $dy_k$ described with reference to FIG. 10. In the present embodiment, as described with reference to FIG. 11, the correction unit 417 executes correction of reducing the travel width W based on the protrusion amount $dy_k$. This causes the specific portion AP to go out of the course of the travel range TM before the dump truck 2 and the loader 3 come into contact with each other. Thus, the dump truck 2 stops early, and contact between the dump truck 2 and the loader 3 is suppressed.

[Control Method]

Figure 12:
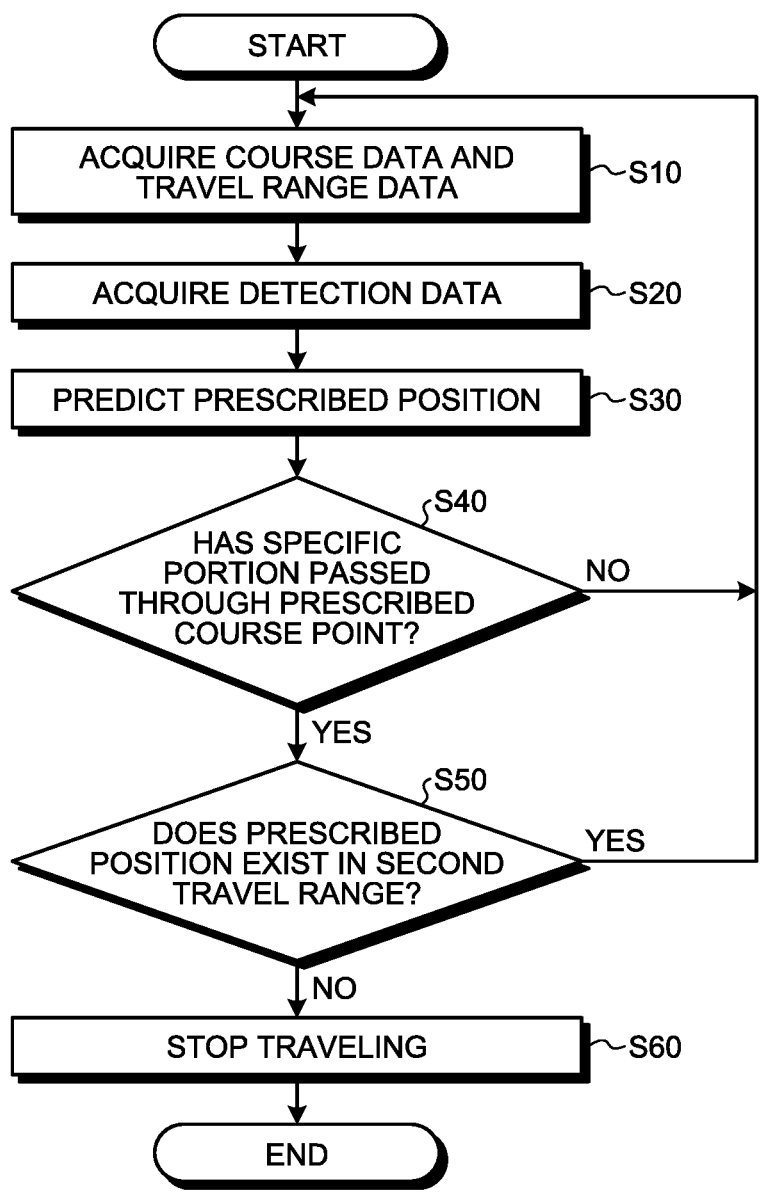
FIG. 12 is a flowchart illustrating an example of a control method of the dump truck according to the present embodiment.

Next, an example of a control method of the dump truck 2 according to the present embodiment will be described. FIG. 12 is a flowchart illustrating an example of a control method of the dump truck 2 according to the present embodiment. In the present embodiment, a control method of the dump truck 2 that is used when the dump truck 2 is brought closer to the loading point LPP while going backward will be described.

The course data generation unit 111 of the management apparatus 10 generates the course data CD indicating the traveling condition of the dump truck 2 that includes the travel route RP. The travel range data generation unit 112 of the management apparatus 10 generates the travel range data AD indicating the first travel range TM1 of the dump truck 2 that is based on the travel route RP, and defined with the preset first travel width W1, and the second travel range TM2 of the dump truck 2 that is based on the travel route RP, and defined with the second travel width W2.

The course data CD and the travel range data AD that have been generated by the management apparatus 10 are transmitted to the control apparatus 40 of the dump truck 2 via the communication system 9. The course data acquisition unit 411 of the control apparatus 40 acquires the course data CD transmitted from the management apparatus 10. In addition, the travel range data acquisition unit 412 of the control apparatus 40 acquires the travel range data AD transmitted from the management apparatus 10 (Step S10).

An absolute position of the dump truck 2 traveling according to the course data CD is detected by the position detector 34. The absolute position data indicating the absolute position of the specific portion AP of the dump truck 2 is acquired by the absolute position data acquisition unit 413 of the control apparatus 40.

Based on the absolute position data of the specific portion AP, the drive control unit 418 performs feedback control of the steering apparatus 33 so as to cause the dump truck 2 to travel in a state in which the specific portion AP and the travel route RP match each other.

In addition, the travel direction of the dump truck 2 traveling according to the course data CD is detected by the detection device 35. The detection data of the detection device 35 that has detected the travel direction of the dump truck 2 is acquired by the detection data acquisition unit 414 of the control apparatus 40 Step S20).

The detection data of the detection device 35 includes detection data of the steering angle sensor 35A that detects a steering angle δ of the dump truck 2, and detection data of the azimuth angle sensor 35B that detects an azimuth angle θ of the dump truck 2. Based on the detection data of the detection device 35, the drive control unit 418 performs feedback control of the steering apparatus 33 so as to cause the dump truck 2 to travel in a state in which the specific portion AP and the travel route RP match each other.

Based on deviation between the specific portion AP and the travel route RP, the drive control unit 418 performs feedback control of the steering apparatus 33. When a gain of feedback is denoted by K, a change amount in the Y-axis direction of the prescribed position FP of the specific portion AP that is obtainable after the dump truck 2 has gone backward from the current position NP by the prescribed distance L is denoted by dy, and a change amount of a rotation amount of the dump truck 2 is denoted by dθ, a control amount $\delta_{FB}$ of controlling the steering apparatus 33 is calculated based on Formula (13). In addition, the prescribed distance L used for prediction in the prediction unit 415 and the prescribed distance L used in Formula (13) may be an equal value or may be different values.

$$\delta_{FB} = -K*(0.001*dy - L\sin d\theta) \quad (13)$$

In addition, when a function of the travel speed V of the dump truck 2 is denoted by f (v), the gain K is represented by Formula (14).

$$K = f(v) \quad (14)$$

By the feedback control being executed based on Formulae (13) and (14), the specific portion AP and the travel route RP can be accurately matched.

The prediction unit 415 predicts the prescribed position FP of the specific portion AP set in the dump truck 2 traveling according to the course data CD, based on the detection data (Step S30).

Based on the absolute position data of the dump truck 2, the determination unit 416 determines whether the specific portion AP of the dump truck 2 going backward toward the loading point LPP has passed through the prescribed course point PI0 described with reference to FIGS. 6 and 7 (Step S40).

In Step S40, when it is determined that the specific portion AP of the dump truck 2 going backward has not passed through the prescribed course point PI0 (Step S40: No), the control apparatus 40 returns to the processing in Step S10.

In Step S40, when it is determined that the specific portion AP of the dump truck 2 going backward has passed through the prescribed course point PI0 (Step S40: Yes), the determination unit 416 determines whether the prescribed position FP of the specific portion AP that has been predicted by the prediction unit 415 exists in the second travel range TM2 (Step S50).

In Step S50, when it is determined that the prescribed position FP of the specific portion AP of the dump truck 2 going backward exists in the second travel range TM2 (Step S50: Yes), the control apparatus 40 returns to the processing in Step S10. In other words, when it is determined that the prescribed position FP of the specific portion AP exists in the second travel range TM2, backward traveling of the dump truck 2 going toward the loading point LPP is continued.

In Step S50, when it is determined that the prescribed position FP of the specific portion AP of the dump truck 2 going backward does not exist in the second travel range TM2 (Step S50: No), the drive control unit 418 stops the traveling of the dump truck 2 (Step S60). This suppresses contact between the dump truck 2 and the loader 3.

Figure 13:
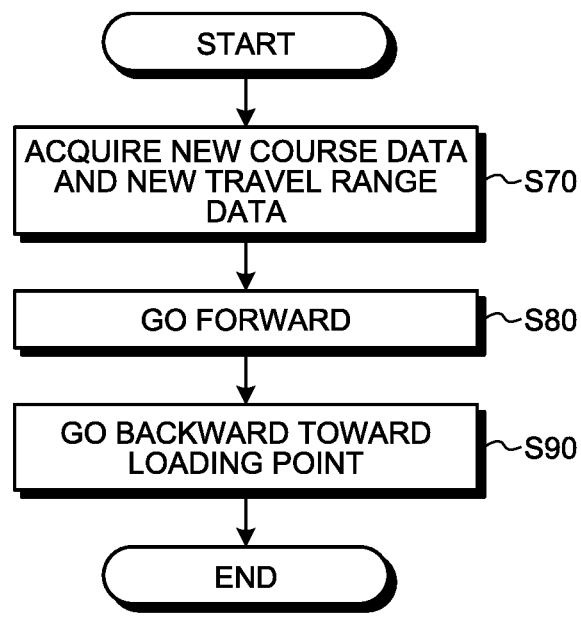
FIG. 13 is a flowchart illustrating an example of a control method of the dump truck according to the present embodiment.

Next, an example of a control method of the dump truck 2 that is used when the traveling of the dump truck 2 of which the traveling has been stopped in Step S60 is restarted will be described. FIG. 13 is a flowchart illustrating an example of a control method of the dump truck 2 that is used when the traveling of the dump truck 2 of which the traveling has been stopped is restarted, according to the present embodiment.

When the traveling of the dump truck 2 going backward is stopped, a driver of the loader 3 operates an operation device provided in the loader 3. By the operation device being operated, a command signal commanding the generation of new course data, and a command signal commanding the restart of the traveling of the dump truck 2 are generated. The command signals generated by the operation of the operation device are transmitted to the management apparatus 10 via the communication system 9.

The course data generation unit 111 of the management apparatus 10 generates new course data CDn. In addition, the travel range data generation unit 112 of the management apparatus 10 generates new travel range data ADn.

The new course data CDn and the new travel range data ADn that have been generated by the management apparatus 10 are transmitted to the control apparatus 40 of the dump truck 2 via the communication system 9. The course data acquisition unit 411 of the control apparatus 40 acquires the new course data CDn transmitted from the management apparatus 10. In addition, the travel range data acquisition unit 412 of the control apparatus 40 acquires the new travel range data ADn transmitted from the management apparatus 10 (Step S70).

The course data CD acquired in Step S10 and the new course data CDn acquired in Step S70 are different. In addition, the travel range data AD acquired in Step S10 and the new travel range data ADn acquired in Step S70 are different. The new course data CDn includes a new travel route RPn different from the travel route RP defined by the course data CD. The new travel range data ADn includes a new second travel range TM2n different from the second travel range TM2 defined by the travel range data AD. The new second travel range TM2n is zonally set along the new travel route RPn so as to include the new travel route RPn. In addition, the second travel width W2 of the second travel range TM2 and a second travel width W2n of the new second travel range TM2n are equal.

The drive control unit 418 restarts the traveling of the dump truck 2 based on the new course data CDn acquired by the course data acquisition unit 411.

The new course data CDn includes a traveling condition of causing the dump truck 2 to go backward after going forward. The drive control unit 418 causes the dump truck 2 in a stopped state to once go forward (Step S90).

After the dump truck 2 has gone forward, the drive control unit 418 causes the dump truck 2 to go backward toward the loading point LPP (Step S80).

In the present embodiment, the new travel route RPn defined by the new course data CDn and used when the dump truck 2 is caused to go backward, and the travel route RP defined by the course data CD and used when the dump truck 2 is caused to go backward are different. In the new course data CDn, the new travel route RPn is defined so that the dump truck 2 goes straight-backward toward the loading point LPP. This suppresses out-of-course of the prescribed position FP of the specific portion AP of the dump truck 2 from the new second travel range TM2n, so that the dump truck 2 can move to the loading point LPP.

After the dump truck 2 has moved to the loading point LPP, a loading work of loading freight onto the dump truck 2 is executed by the loader 3. The dump truck 2 on which the freight is loaded goes away from the loading point LPP.

[Effects]

As described above, according to the present embodiment, there are provided the course data acquisition unit 411 that acquires the course data CD indicating the traveling condition of the dump truck 2 that includes the travel route RP, the travel range data acquisition unit 412 that acquires the travel range data AD indicating the travel range TM of the dump truck 2 that is based on the travel route RP and defined with the preset travel width W, the detection data acquisition unit 414 that acquires detection data of the detection device 35 that has detected the travel direction of the dump truck 2, the prediction unit 415 that predicts the prescribed position FP of the dump truck 2 traveling according to the course data CD, based on the detection data, the determination unit 416 that determines whether the prescribed position FP exists within the travel range TM, and the drive control unit 418 that stops the traveling of the dump truck 2 when it is determined that the prescribed position FP does not exist within the travel range TM. This suppresses contact between the dump truck 2 and an obstacle when the obstacle exists near the travel range TM of the dump truck 2 traveling according to the course data CD. Thus, a deterioration of productivity in a work location is suppressed.

In addition, in the present embodiment, the travel range TM includes the first travel range TM1 defined with the first travel width W1, and the second travel range TM2 defined with the second travel width W2 smaller than the first travel width W1. The dump truck 2 travels from the first travel range TM1 to the second travel range TM2. The drive control unit 418 stops the traveling of the dump truck 2 when it is determined that the prescribed position FP predicted based on the detection data acquired when the dump truck 2 is traveling at the course point PI0 in the first travel range TM1 does not exist in the second travel range TM2. This suppresses contact between the dump truck 2 and an obstacle when the obstacle exists near the second travel range TM2.

In addition, in the present embodiment, the second travel range TM2 includes the loading point LPP where freight is loaded onto the dump truck 2. This suppresses contact between the loader 3 and the dump truck 2 traveling toward the loading point LPP.

In addition, in the present embodiment, the second travel width W2 is set based on the size of the loader 3. This effectively suppresses contact between the dump truck 2 and the loader 3. In addition, because the dump truck 2 disposed at the loading point LPP is disposed at an appropriate position for executing the loading work by the loader 3, the loading work is smoothly executed.

In addition, in the present embodiment, the traveling condition of the dump truck 2 that is defined by the course data CD includes the travel speed V of the dump truck 2. The travel speed V2 of the dump truck 2 in the second travel range TM2 is equal to or smaller than the travel speed V1 of the dump truck 2 in the first travel range TM1. In the first travel range TM1 that is distant from the loader 3, there is a low possibility of contact between the loader 3 and the dump truck 2 traveling in the first travel range TM1. Thus, by increasing the travel speed V1 of the dump truck 2 in the first travel range TM1, a deterioration of productivity in the mine is suppressed. In addition, because the first travel width W1 of the first travel range TM1 is large, even if the travel speed V1 of the dump truck 2 is high, a possibility of a movement of the specific portion AP toward the outside of the first travel range TM1 is suppressed. This reduces the frequency of out-of-course determination, and suppresses frequent stop of the traveling of the dump truck 2. On the other hand, in the second travel range TM2 close to the loader 3, there is a high possibility of contact between the loader 3 and the dump truck 2 traveling in the second travel range TM2. Thus, by narrowing the second travel width W2 of the second travel range TM2, out-of-course determination is immediately made and the traveling of the dump truck 2 is stopped if a deviation amount between the specific portion AP of the dump truck 2 and the travel route RP becomes large. Thus, contact between the dump truck 2 and the loader 3 can be prevented before happens. In addition, if the travel speed V2 of the dump truck 2 traveling in the second travel range TM2 is increased, a possibility of a movement of the specific portion AP toward the outside of the second travel range TM2 becomes higher. As a result, the frequency of out-of-course determination becomes higher, and the traveling of the dump truck 2 is frequently stopped. Productivity in the mine accordingly deteriorates. In the second travel range TM2 defined with the small second travel width W2, by reducing the travel speed V2 of the dump truck 2, the frequency of out-of-course determination is reduced, and frequent stop of the traveling of the dump truck 2 is suppressed. Thus, a deterioration of productivity in the mine is suppressed.

In addition, in the present embodiment, the front wheels 25F of the dump truck 2 are steered by the steering apparatus 33, and the prescribed position FP of the specific portion AP set at the center portion of the wheel axis 27 supporting the rear wheels 25R of the dump truck 2 going backward is predicted as the prescribed position FP of the dump truck 2. This reduces calculation processing load in the prediction of the specific portion AP.

In addition, in the present embodiment, as described with reference to FIG. 11, the travel width W is corrected based on the protrusion amount $dy_k$ calculated from the steering angle δ and the dimensions of the dump truck 2. In the present embodiment, correction of subtracting the protrusion amount $dy_k$ from the travel width W of the travel range TM acquired from the travel range data acquisition unit 412 is executed. In other words, if the protrusion amount $dy_k$ is large, the travel width W becomes smaller. By restricting the traveling of the dump truck 2 by narrowing the travel width W if the protrusion amount $dy_k$ is large, contact between the dump truck 2 and an obstacle can be suppressed more effectively.

In addition, in the present embodiment, when it is determined that the prescribed position FP of the dump truck 2 going backward does not exist within the travel range TM, the drive control unit 418 stops the traveling of the dump truck 2, and restarts the traveling of the dump truck 2 based on the new course data CDn acquired by the course data acquisition unit 411. The new course data CDn includes a traveling condition of causing the dump truck 2 to go backward after going forward. The course data CD according to which the dump truck 2 has failed in the entry to the loading point LPP is updated to the new course data CDn that is different from the course data CD. By the traveling of the dump truck 2 being controlled based on the new course data CDn, a success rate of the entry of the dump truck 2 into the loading point LPP increases.

Figure 14:
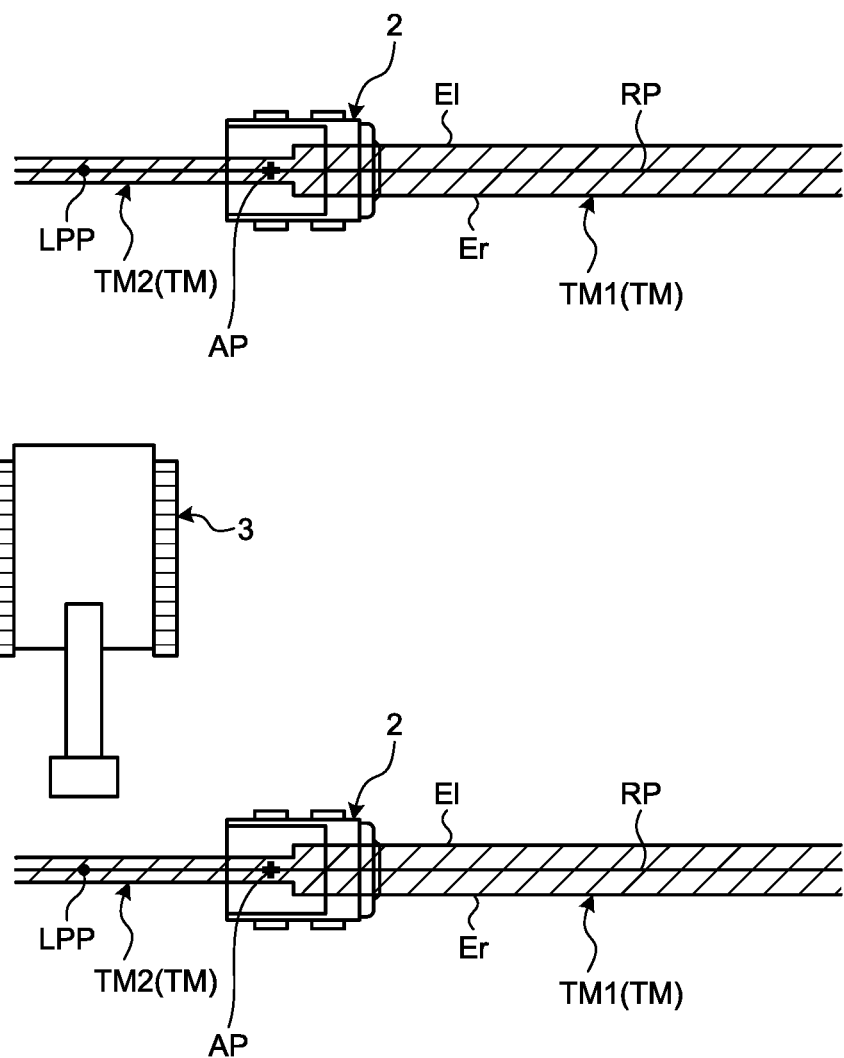
FIG. 14 is a diagram schematically illustrating an example of travel range data in a loading site according to the present embodiment.

In addition, in the aforementioned embodiment, the loader 3 is assumed to exist on the end portion El side of the travel range TM. As illustrated in FIG. 14, when so-called double side loading in which loading points LPP are set on the both sides of the loader 3 is executed, the loader 3 exists on the end portion El side in the travel range TM including one loading point LPP, and the loader 3 exists on the end portion Er side in the travel range TM including another loading point LPP. The traveling of the dump truck 2 is stopped when the specific portion AP of the dump truck 2 that comes close to the one loading point LPP is predicted to be disposed on the outside of the end portion El, and stops the traveling of the dump truck 2 when the specific portion AP of the dump truck 2 that comes close to the other loading point LPP is predicted to be disposed on the outside of the end portion Er. Contact between the dump truck 2 and the loader 3 is thereby prevented also when the double side loading is executed.

In addition, in the aforementioned embodiment, the first travel width W1 of the first travel range TM1 and the second travel width W2 of the second travel range TM2 that are generated by the management apparatus 10 are assumed to change in a step-like manner. As illustrated in FIG. 15, at the boundary of the first travel range TM1 and the second travel range TM2 that are generated by the management apparatus 10, the second travel width W may change in a slope-like manner.

In addition, in the aforementioned embodiment, the prescribed position FP is assumed to be predicted when the dump truck 2 enters the loading point LPP. The prescribed position FP may be predicted when the dump truck 2 enters an unloading point where an unloading work of the dump truck 2 is executed. The traveling of the dump truck 2 may be stopped when the second travel range TM2 is set so as to include the unloading point, and it is determined that the prescribed position FP predicted based on the detection data acquired when the dump truck 2 is traveling in the first travel range TM1 toward the unloading point does not exist in the second travel range TM2.

In addition, in the aforementioned embodiment, the prediction unit 415 is assumed to predict the prescribed position FP of the specific portion AP set in the dump truck 2 that has traveled from the current position NP by the prescribed distance L, based on detection data acquired when the dump truck 2 exists at the current position NP. The prescribed position FP of the dump truck 2 may be a position of the specific portion AP set in the dump truck 2 after the lapse of a prescribed time from the acquisition time point of the detection data. The prediction unit 415 may predict the prescribed position FP of the dump truck 2 at a future time point that comes after the lapse of the prescribed time from a current time point, based on detection data acquired at the current time point.

In addition, in the aforementioned embodiment, the travel width W of the travel range TM needs not be corrected by the correction unit 417.

In addition, in the aforementioned embodiment, the specific portion AP of which the prescribed position FP is predicted needs not be a center portion of the wheel axis 27, and may be, for example, a center portion of a wheel axis supporting the front wheels 25F of the dump truck 2, and may be one portion of the vehicle body frame 21 of the dump truck 2.

In addition, in the aforementioned embodiment, the travel speed V2 of the dump truck 2 in the second travel range TM2 may be lower than the travel speed V1 of the dump truck 2 in the first travel range TM1.

In addition, in the aforementioned embodiment, the travel range TM is assumed to include the two travel ranges TM1 and TM2 having different travel widths W. The travel range TM may include three or more travel ranges TM having different travel widths W. In addition, the travel width W of the travel range TM may be a single width.

In addition, in the aforementioned embodiment, the dump truck 2 is assumed to be an unmanned dump truck. The dump truck 2 may be a manned dump truck that travels according to an operation of a driver that rides in the dump truck 2.

In addition, in the aforementioned embodiment, at least part of components of the control apparatus 40 may be provided in the management apparatus 10. More specifically, part or all of the functions of the course data acquisition unit 411, the travel range data acquisition unit 412, the absolute position data acquisition unit 413, the detection data acquisition unit 414, the prediction unit 415, the determination unit 416, the correction unit 417, and the drive control unit 418 may be included in the management apparatus 10 provided in the control facility 7. For example, by detection data of the position detector 34 and the detection device 35 that are provided in the dump truck 2, being transmitted to the management apparatus 10 via the communication system 9, the management apparatus 10 can generate a control signal for controlling the driving of the dump truck 2, according to the aforementioned embodiment. By the control signal generated by the management apparatus 10, being transmitted to the dump truck 2 via the communication system 9, the dump truck 2 can travel according to the aforementioned embodiment.

In addition, in the aforementioned embodiment, the description has been given using a work vehicle used in a mine, as an example. The components described in the aforementioned embodiment may be applied to a work vehicle used in a work location different from a mine. In addition, the work vehicle needs not be the dump truck 2, and may be a work vehicle that can execute a loading work, such as a wheel loader, for example.

REFERENCE SIGNS LIST

1 MANAGEMENT SYSTEM
2 DUMP TRUCK (WORK VEHICLE)
2F ANTERIOR PORTION
2R POSTERIOR PORTION
3 LOADER
5 POSITIONING SATELLITE
6 RELAYING DEVICE
7 CONTROL FACILITY
9 COMMUNICATION SYSTEM
10 MANAGEMENT APPARATUS
11 ARITHMETIC PROCESSING UNIT
12 STORAGE DEVICE
13 INPUT-OUTPUT INTERFACE
14 WIRELESS COMMUNICATION DEVICE
15 INPUT DEVICE
16 OUTPUT DEVICE
21 VEHICLE BODY FRAME
22 DUMP BODY
23 TRAVEL APPARATUS
24 TIRE
25 WHEEL
25F FRONT WHEEL
25R REAR WHEEL
26 REAR AXLE
27 WHEEL AXIS
31 DRIVING APPARATUS
32 BRAKING APPARATUS
33 STEERING APPARATUS
34 POSITION DETECTOR
35 DETECTION DEVICE
35A STEERING ANGLE SENSOR
35B AZIMUTH ANGLE SENSOR
40 CONTROL APPARATUS
41 ARITHMETIC PROCESSING UNIT
42 STORAGE DEVICE
43 INPUT-OUTPUT INTERFACE
44 WIRELESS DEVICE
111 COURSE DATA GENERATION UNIT
112 TRAVEL RANGE DATA GENERATION UNIT
301 LOWER TRAVEL BODY
302 UPPER SWING BODY
303 WORK DEVICE
411 COURSE DATA ACQUISITION UNIT
412 TRAVEL RANGE DATA ACQUISITION UNIT
413 ABSOLUTE POSITION DATA ACQUISITION UNIT
414 DETECTION DATA ACQUISITION UNIT
415 PREDICTION UNIT
416 DETERMINATION UNIT
417 CORRECTION UNIT
418 DRIVE CONTROL UNIT
AD TRAVEL RANGE DATA
AP SPECIFIC PORTION
CD COURSE DATA
CR CRUSHER
DPA EARTH UNLOADING SITE
Er END PORTION
El END PORTION
FP PRESCRIBED POSITION
G INTERVAL
HL CONVEYING ROAD
IS INTERSECTION
L PRESCRIBED DISTANCE
LPA LOADING SITE
LPP LOADING POINT
PA WORK LOCATION
PI COURSE POINT
RP TRAVEL ROUTE
SBP SWITCHBACK POINT
TM TRAVEL RANGE
TM1 FIRST TRAVEL RANGE
TM2 SECOND TRAVEL RANGE
W TRAVEL WIDTH
W1 FIRST TRAVEL WIDTH
W2 SECOND TRAVEL WIDTH

The invention claimed is:

1. A management system of a work vehicle comprising:
a course data generation unit implemented in a processor and configured to generate course data indicating a travel route of a work vehicle;
a travel range data generation unit implemented in a processor and configured to generate travel range data indicating a travel range defined by a travel width of the work vehicle and the travel route, so as to narrow the travel width by adjusting the travel width to enable the work vehicle to come close to a loading point in a loading site by going backward; and
an input-output unit implemented in an input-output interface and configured to output the course data and the travel range data to the work vehicle via a wireless communication device, wherein
a center portion of a wheel axis in a vehicle width direction of the work vehicle is defined as a specific portion,
the travel range data generation unit sets a first travel width in the area where a first deviation amount between the specific portion and the travel route is allowed, and sets a second travel width smaller than the first travel width in the area where a second deviation amount smaller than the first deviation amount between the specific portion and the travel route is needed, and
the input-output unit causes the work vehicle to travel according to the course data and the travel range data by outputting the course data and the travel range data to the work vehicle.

2. The management system of the work vehicle according to claim 1, wherein
the travel range data generation unit generates the travel range data so as to narrow the travel width by gradation, between a switchback point where the work vehicle shifts from going forward to going backward on the travel route, and the loading point.

3. The management system of the work vehicle according to claim 1, wherein
the course data generation unit generates the course data indicating a travel speed of the work vehicle so that the work vehicle can become slower with the travel width narrowing.

4. The management system of the work vehicle according to claim 3, wherein
the travel range data generation unit sets the travel width based on an obstacle existing around the work vehicle traveling according to the travel route, and
the course data generation unit sets the travel speed of the work vehicle based on the travel width.

5. The management system of the work vehicle according to claim 1, wherein
the travel range data generation unit sets the travel width at the loading point based on a size of a loader operable to load freight onto the work vehicle.

6. A management method of a work vehicle comprising the steps of:

generating course data indicating a travel route of a work vehicle;

generating travel range data indicating a travel range defined by a travel width of the work vehicle and the travel route, so as to narrow the travel width by adjusting the travel width to enable the work vehicle to come close to a loading point in a loading site by going backward; and outputting the course data and the travel range data to the work vehicle via a wireless communication device, wherein a center portion of a wheel axis in a vehicle width direction of the work vehicle is defined as a specific portion, when generating the travel range data, setting a first travel width in the area where a first deviation amount between the specific portion and the travel route is allowed, and setting a second travel width smaller than the first travel width in the area where a second deviation amount smaller than the first deviation amount between the specific portion and the travel route is needed, and causing the work vehicle to travel according to the course data and the travel range data by outputting the course data and the travel range data to the work vehicle.

7. A management system of a work vehicle comprising:

a course data generation unit implemented in a processor and configured to generate course data indicating a travel route of a work vehicle;

a travel range data generation unit implemented in a processor and configured to generate travel range data indicating a travel range defined by a travel width of the work vehicle and the travel route, so as to narrow the travel width by adjusting the travel width to enable the work vehicle to come close to a loading point in a loading site by going backward;

an input-output unit implemented in an input-output interface and configured to output the course data and the travel range data to the work vehicle via a wireless communication device, wherein the travel range data generation unit sets the travel width at the loading point based on a size of a loader operable to load freight onto the work vehicle, and the input-output unit causes the work vehicle to travel according to the course data and the travel range data by outputting the course data and the travel range data to the work vehicle.

* * * * *